US010491126B1

(12) United States Patent
Pastore et al.

(10) Patent No.: US 10,491,126 B1
(45) Date of Patent: Nov. 26, 2019

(54) CLOSED LOOP FOLDBACK CONTROL

(71) Applicant: POWER INTEGRATIONS, INC., San Jose, CA (US)

(72) Inventors: Tiziano Pastore, Los Gatos, CA (US); Sundaresan Sundararaj, Union City, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 16/219,613

(22) Filed: Dec. 13, 2018

(51) Int. Cl.
*H02M 3/335* (2006.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 3/33523* (2013.01); *H02M 2001/0009* (2013.01)

(58) Field of Classification Search
None
See application file for complete search history.

(56) References Cited

U.S. PATENT DOCUMENTS

| 4,180,768 | A | 12/1979 | Ferraro | |
|---|---|---|---|---|
| 7,554,783 | B2 | 6/2009 | Heath et al. | |
| 7,859,812 | B2 * | 12/2010 | Chen | G05F 1/573 361/93.9 |
| 8,450,948 | B2 | 5/2013 | Huang et al. | |
| 9,537,405 | B2 | 1/2017 | Baurle et al. | |
| 9,572,224 | B2 | 2/2017 | Gaknoki et al. | |
| 9,967,939 | B2 | 5/2018 | Bandel et al. | |
| 2008/0061752 | A1 * | 3/2008 | Heath | G05F 1/5735 323/277 |
| 2009/0256545 | A1 * | 10/2009 | Wang | H02M 3/33507 323/299 |
| 2011/0058297 | A1 * | 3/2011 | Higashida | H03K 17/0822 361/93.9 |
| 2012/0062120 | A1 | 3/2012 | Riesebosch | |
| 2017/0250450 | A1 | 8/2017 | Xie et al. | |
| 2018/0102709 | A1 | 4/2018 | Hari et al. | |

* cited by examiner

*Primary Examiner* — Jeffrey A Gblende
(74) *Attorney, Agent, or Firm* — Christensen O'Connor Johnson Kindness PLLC

(57) ABSTRACT

A controller for use in a power converter includes comparator coupled to generate a regulation signal in response to a regulation reference and an output sense signal. The output sense signal is representative of an output of the power converter. A drive signal generator is coupled to the comparator to generate a drive signal to control switching of a power switch of the power converter in response to the regulation signal. The drive signal generator is further coupled to generate an operation sense signal representative of an operational state of the power switch. A foldback control is coupled to the comparator and the drive signal generator to generate the regulation reference in response to the regulation signal and the operation sense signal.

43 Claims, 12 Drawing Sheets

CLOSED LOOP FOLDBACK CONTROL

BACKGROUND INFORMATION

Field of the Disclosure

The present invention relates generally to power converters, and more specifically to switched mode power converters which are controlled by a controller.

Background

Many electronic devices, such as cell phones, laptops, etc., are powered by direct current (dc) power derived from a power supply. Conventional wall outlets generally deliver a high voltage alternating current (ac) power that is converted to regulated dc power in order to be used as a power source for consumer electronic devices. In some applications, a power conversion system may cascade one or more power converter stages including a power factor correction (PFC) stage. Switch mode power converters are commonly used due to their high efficiency, small size, and low weight to convert a high voltage ac power to a regulated dc power.

The switched mode power converter also includes at controller. Output regulation may be achieved by sensing and controlling the output in a closed loop. The controller may receive a signal representative of the output, and the controller varies one or more parameters in response to the signal to regulate the output to a desired quantity. Various modes of control may be utilized such as pulse width modulation (PWM) control, pulse frequency modulation (PFM) control, or ON/OFF control. In one example, switched mode power converters are used to provide regulated power to light emitting diode (LED) devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
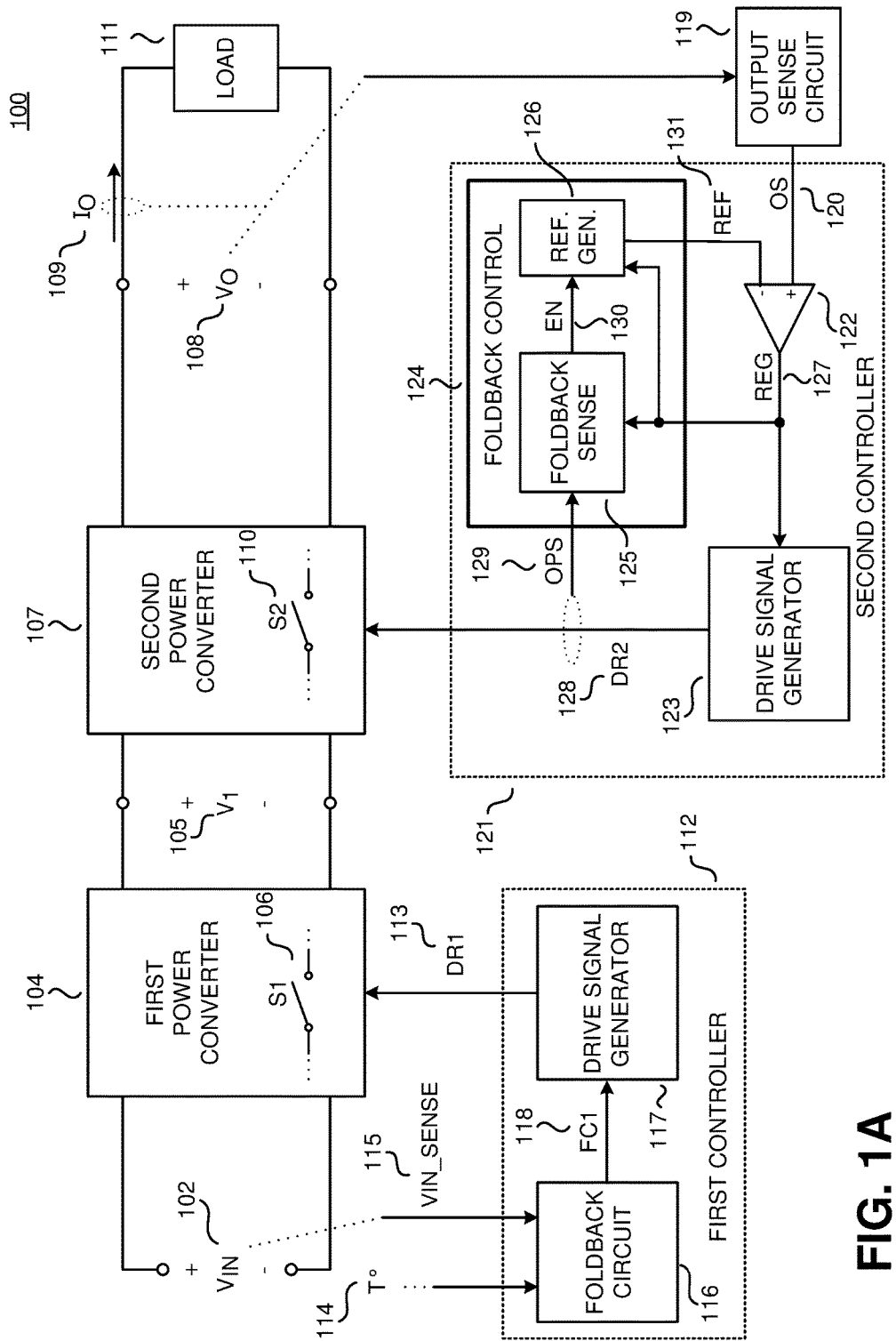
FIG. 1A is a schematic illustrating an example two-stage power conversion system with foldback control, in accordance with embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Power conversion systems may use one or more power converters to provide a regulated output. Each power converter could be referred to as a "stage" of the power converter system. For example, a two-stage power converter system could be used to provide output regulation and power factor correction. Regulatory agencies set standards for particular characteristics of the current that may be drawn from the ac electrical outlet. One standard places limits on the power factor correction (PFC) that should be included for electronic devices. The power factor is the ratio of the average power over a cycle and the product of the root mean square (rms) voltage and the rms current. The power factor has a value between zero and one with unity power factor as the ideal case. Generally, the closer the shape of the input current waveform is to the shape of the input voltage waveform of a power conversion system, the greater the power factor. The first stage of a two-stage power converter system for PFC is generally a PFC circuit, which attempts to shape the input current waveform to achieve unity power factor. In general, a step-up power converter, such as a boost converter, may be used as a PFC circuit. The second stage is generally a switched mode power converter, which provides the regulated output.

Both the PFC circuit (first stage) and the switched mode power converter (second stage) each have a controller that controls the transfer of energy from the input to the output for each stage by controlling one or more power switches. In general, the controller for the first stage does not communicate with the controller for the second stage. As such, the first stage may sense and respond to fault conditions, but the fault conditions are not communicated to the second stage. For example, the first stage may sense a fault condition, such as brown in/brown out, input undervoltage, or thermal overload. In response to the sensed fault condition, the first stage may reduce its output, which is also referred to as foldback. Foldback could be utilized to protect components in the first stage. The output of the first stage is the input of the second stage. Without communication between the two stages, the second stage does not know that a fault has been detected and does not foldback its output. Instead the second stage observes a reduction in its input and works harder to maintain regulation of its output. This may put extra stress on the second stage and reduce the lifetime or otherwise damage its components.

A similar issue can occur with isolated power converters that have a primary power switch on the primary side (input) of the power converter and a secondary switch (such as a synchronous rectifier or a pass switch) on the secondary side (output) of the power converter. With both a primary power switch and a secondary switch, the isolated power converter also includes a primary controller referenced to the primary side and a secondary controller referenced to the secondary side. The two controllers may not communicate, or communication may be unidirectional (e.g., from the secondary controller to the primary controller). As such, fault conditions sensed by the primary controller are not directly communicated to the secondary controller. The primary controller can sense fault conditions, such as brown in/brown out, input undervoltage, or thermal overload, and stop switching the primary power switch. However, without the information regarding the sensed fault condition, the secondary controller continues to regulate the output of the power converter and does not foldback.

As will be discussed, embodiments in accordance with the teachings of the present invention include a second stage controller or secondary controller with foldback control. The foldback control indirectly determines if the first stage controller or primary controller has entered a foldback or fault condition and varies a regulation reference to reduce the output of the power converter. The regulation reference is compared to the sensed output of the power converter and is the target value at which the output of the power converter is regulated. The result of the comparison between the regulation reference and the sensed output is referred to as the regulation signal. The regulation signal can be used by the first stage controller/primary controller and/or the second stage controller/secondary controller to control their respective switches to regulate the output provided to a load of the power converter. The foldback control employs closed loop control of the regulation reference via the regulation signal to reduce the output of the power converter under foldback or fault conditions.

The foldback control includes a foldback sense and a reference generator. The foldback sense indirectly senses if the first stage controller or primary controller has entered a foldback or fault condition. The foldback sense may indirectly sense foldback or fault by monitoring the operation of the second or secondary switch or by monitoring the regulation signal. The foldback sense receives the regulation signal and determines that there is a first stage/primary foldback or fault condition if the regulation signal indicates that the sensed output is less than the regulation reference for a threshold duration of time. The foldback sense also receives an operational sense signal representative of the operational state of the second power switch of the second power converter or a secondary switch of an isolated converter. For example, the operational state may refer to one or more of the on-time, off-time, duty ratio, frequency, or pulses per unit time of the second power switch/secondary switch. The foldback sense may indirectly sense foldback or fault by if the operational state of the second power switch/secondary switch, indicated by the operation sense signal indicates is higher than expected for normal conditions.

Once the foldback senses that there is a first stage/primary foldback or fault, the foldback sense signal outputs an enable signal to enable the reference generator. The reference generator varies and outputs the regulation reference in a closed loop via the regulation signal. Once enabled, the reference generator varies the regulation reference in response to the regulation signal. In one example, the reference generator reduces the regulation reference until the shape of the regulation signal is substantially similar to the shape of the regulation signal under non-foldback conditions. However, the regulation reference has decreased and as such the output of the power converter has decreased.

To illustrate, FIG. 1A shows one example of a power conversion system 100 with a first power converter 104 and second power converter 107 in accordance with the teachings of the present invention. The first power converter 104 is controlled by the first controller 112 while the second power converter 107 is controlled by the second controller 121. The second controller 121 includes a foldback control 124 in accordance with an embodiment of the disclosure. As shown in the depicted example, there is no direct communication between the first controller 112 and the second controller 121. Both the first controller 112 and second controller 121 may be isolated or non-isolated switched mode power converters, such as a boost or buck converter, flyback converter, forward converter, resonant converter, etc.

In one example, the power conversion system 100 provides output power to the load 111 from an unregulated input voltage $V_{IN}$ 102, which in one example is a rectified ac line voltage or a rectified and filtered ac line voltage. The first power converter 104 is coupled to receive the input voltage $V_{IN}$ 102 and provides a regulated first voltage $V_1$ 105. The first power converter 104 includes a first power switch S1 106, which is controlled by the first controller 112. The first controller 112 includes a drive signal generator 117, which regulates the output first voltage V1 105 of the first power converter 104. Although not shown, the drive signal generator 117 is coupled to receive a sense signal representative of the first voltage V1 105 and generates the first drive signal DR1 113 to control the switching of the first power switch S1 106. In one example, the first drive signal DR1 113 is a rectangular pulse waveform with varying durations of logic high and logic low sections. In one example, a logic high value in the first drive signal DR1 113 turns on the first power switch S1 106 while a logic low value turns off the first power switch S1 106. The duration of the logic high sections may be referred to as the on-time of the first drive signal DR1 113 while the duration of the logic low sections may be referred to as the off-time of the first drive signal DR1 113. Further, the sum of the on-time and the off-time may be referred to as the switching period, which is the inverse of the switching frequency.

The first controller 112 also includes a foldback circuit 116, which senses foldback or fault conditions. As shown, the foldback circuit 116 is coupled to receive an input voltage sense signal VIN_SENSE 115 representative of the input voltage $V_{IN}$ 102 and a temperature signal 114 representative of the temperature of one or more components of the first power converter 104. For example, the temperature signal 114 may be representative of the temperature of the first power switch S1 106, an energy transfer element of either power converter, secondary rectifiers, or a metal chassis which surrounds either power converters or both. In response to either the input voltage sense signal VIN_SENSE 115 or the temperature signal 114, the foldback circuit 116 outputs the foldback signal FC1 118 to the drive signal generator 117 to foldback or reduce the first voltage V1 105. If the sensed temperature is too high or the input voltage VIN 102 is too low, the foldback circuit 116 outputs the foldback signal FC1 118 to the drive signal generator 117 to reduce the first voltage V1 105. For example, input voltages below 85 Vac could trigger the foldback circuit 116 to reduce the output of the first power converter 104. The thermal threshold which triggers the foldback circuit 16 could be selectable by a user. Options for the thermal threshold could include 100° C. (Celsius), 110° C., 120° C., or 130° C.

The second power converter 107 is coupled to receive first voltage $V_1$ 105 from first power converter 104 and provides a regulated output to the load 111. The second power converter 107 includes a second power switch S2 110, which is controlled by the second controller 121 to regulate the output of the second power converter 107. In general, the output of the second power converter 107 is an output voltage $V_O$ 108, an output current $I_O$ 109, or a combination of the two. An output sense circuit 119 is coupled to sense the output of the second power converter 107 to provide the output sense signal OS 120, which is also sometimes referred to as a feedback signal. The output sense signal OS 121 may be representative of the output voltage $V_O$ 116, an output current $I_O$ 117, or a combination of the two.

As shown in the depicted example, the second controller 121 is shown as including regulation signal generation circuitry with a comparator 122, a drive signal generator 123, and a foldback control 124. The second controller 121 is coupled to receive the output sense signal OS 120 at the comparator 122. Comparator 122 is further coupled to receive a regulation reference 131. As shown, the regulation reference 131 is received at the inverting input of comparator 122 while the output sense signal OS 120 is received at the non-inverting input of comparator 122. The output of comparator 122 is the regulation signal REG 127, and is representative of the value of the output sense signal OS 120 being above or below the regulation reference 121. The drive signal generator 123 generates the second drive signal DR2 128 in response to the regulation signal REG 127. The second drive signal DR2 128 controls the turn on and the turn off of the second power switch S2 110. In one example, the second drive signal DR2 128 is a rectangular pulse waveform with varying durations of logic high and logic low sections. Logic high could correspond to a switch that is turned on while logic low could correspond to a switch that is turned off. The duration of the logic high sections may be referred to as the on-time of the second power switch S2 110 while the duration of the logic low sections may be referred to as the off-time of the second power switch S2 110. Further, the sum of the on-time and the off may be referred to as the switching period, which is the inverse of the switching frequency.

To regulate the output provided to load 111, the second controller 121 may vary one or more switching parameters of the second power switch S2 110 via the drive signal DR2 128. Example parameters of the second power switch S2 110 may include the on-time, off-time, and switching frequency/switching period. The various values which the controller 121 may choose for the switching parameters may be referred to as the operational states. In one example, the second controller 121 may control the on-time of the second power switch S2 110 and the various values for the on-time may be the operational states. In another example, the second controller 121 may control the switching frequency and the on-time and the various values for the switching frequency and on-time may be the operational states.

Foldback control 124 is coupled to sense if the first power converter 104 and first controller 112 are operating under foldback or fault conditions from the operation sense signal OPS 129, representative of the operational state of the second power switch S2 110, and/or the regulation signal REG 127. Once sensed, the foldback control 124 varies the regulation reference REF 131 to reduce the output of the second power converter 107. As will be further discussed, the regulation reference REF 131 is varied in response to the regulation signal REG 127 for a closed loop response to the indirectly sensed foldback condition.

Foldback control 124 includes the foldback sense 125 and reference generator 126. The foldback sense may indirectly sense foldback or fault by monitoring the operational state of the second drive signal DR2 128 and the regulation signal REG 127. Foldback sense 125 is coupled to receive the regulation signal REG 127 and determines that a foldback or fault condition exists if the output sense signal OS 120 is less than the regulation reference REF 131 for a threshold duration of time. The output sense signal OS1 20 being less than the regulation reference REF 131 for a threshold duration of time may indicate that the second power converter 107 may be unable to regulate its output due to a reduced input V1 105. As mentioned above, a reduced value of the input V1 105 may be one response by the first power converter 104 and first controller 112 to a foldback or fault condition. The foldback sense 125 is also coupled to receive the operational sense signal OPS 129 and determines that a foldback or a fault condition exists if the second power switch S2 110 is controlled in one or more operational states for a threshold duration of time, indicating that the second power converter 107 may be overcompensating for a reduced value of the first voltage $V_1$ 105.

Once a foldback or a fault condition has been sensed, the foldback sense 125 outputs an enable signal EN 130 to the reference generator 126 to enable the reference generator 126 to vary the regulation reference 131. When the reference generator 126 is not enabled by the foldback sense 125, the reference generator 126 outputs a value for the regulation reference 131 that regulates the output of the second power converter 107 to its initial value under normal operating conditions or other non-foldback operating conditions. Once enabled, the reference generator 126 varies the regulation reference REF 131 in response to the regulation signal REG 127 in a closed-loop manner. Under normal operating conditions, there is a general expected shape for the regulation signal REG 127. The shape of the regulation signal REG 127 varies once the power conversion system 100 is under foldback or fault conditions. The reference generator 126 varies the regulation reference REF 131 in response to the shape of the regulation signal REG 127. Further, the regulation reference REF 131 is varied until the shape of the regulation signal REG 127 resembles the shape of the regulation signal REG 127 under normal operating conditions. In one example, the regulation reference REF 131 is reduced until the shape of the regulation signal is substantially similar to the shape of the regulation signal under normal operating conditions. The reduced regulation reference REF 131 also reduces the output of the second power converter 107 and foldback is applied to the entire power conversion system 100.

Figure 1B:
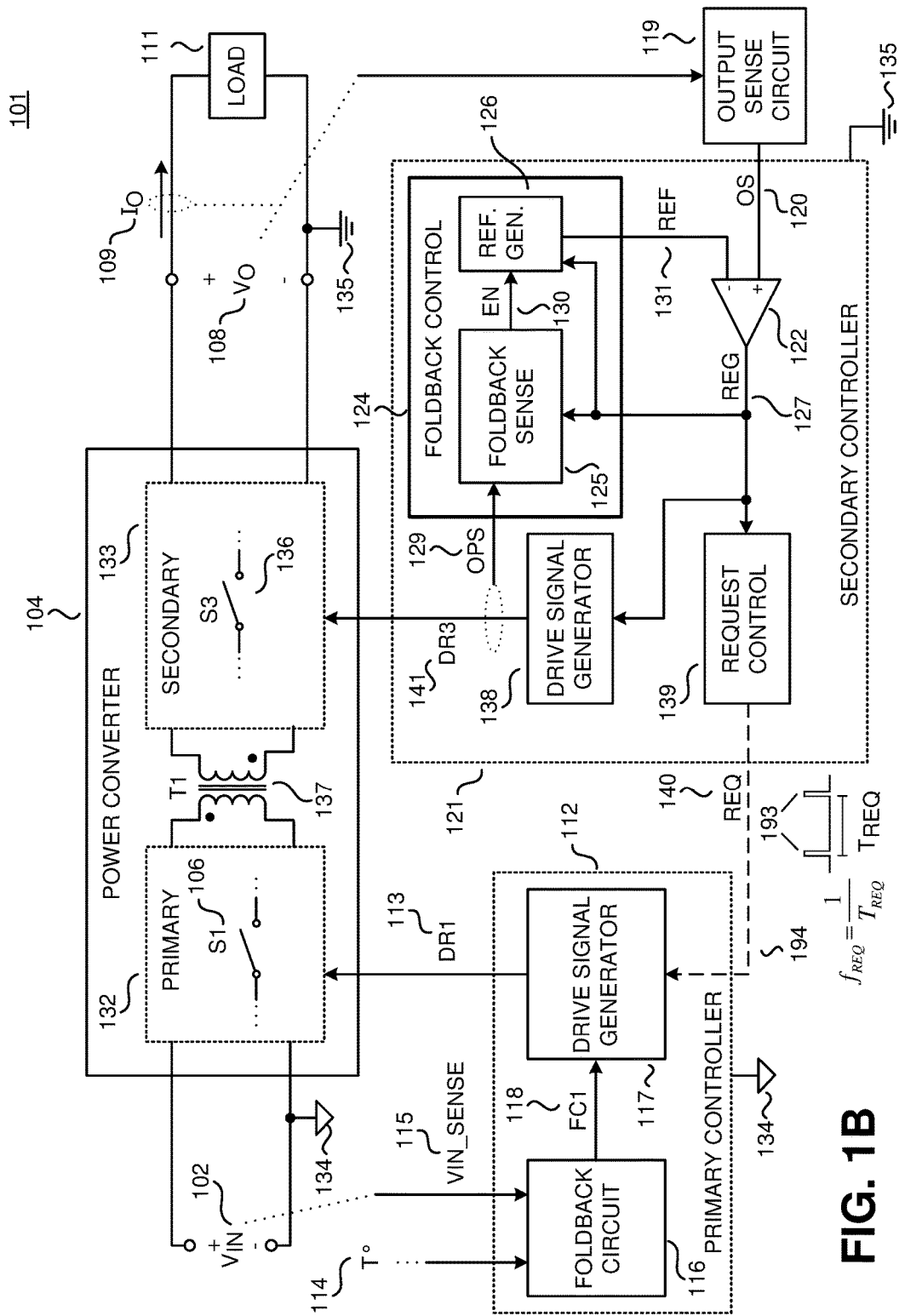
FIG. 1B is a schematic illustrating an example isolated power converter with a secondary controller with foldback control, in accordance with embodiments of the present invention.

FIG. 1B illustrates an example of a power conversion system 101 that utilizes a secondary controller 121 with foldback control in accordance with the teachings of the present invention. The power conversion system 101 shown in FIG. 1B shares many of the same elements as the power conversion system 100 shown in FIG. 1A, and it should be understood that similarly named and numbered elements are coupled and function as described above. At least one difference, however, is that the example power conversion system 101 shown in FIG. 1B is a single-stage power convertor 104 with isolation. The isolated power converter 104 has a primary (e.g., input) side 132 and a secondary (e.g., output) side 133, which are galvanically isolated from each other. As shown, circuitry on the primary side 132 of the power converter 104 are referenced to input return 134 while circuitry on the secondary side 133 are referenced to output return 135. An energy transfer element T1 137 transfers energy and provides galvanic isolation between the primary side 132 and the secondary side 133. The primary controller 112 is referenced to input return 134 and controls a primary power switch S1 106 on the primary side 132 of the power converter 104. Secondary controller 121 is referenced to output return 135 and controls a secondary switch S3 136 on the secondary side 133 of power converter 104.

Power converter 104 provides output power to the load 111 from an unregulated input voltage $V_{IN}$ 102, which in one example is a rectified ac line voltage or a rectified and filtered ac line voltage. Power converter 104 is coupled to receive the input voltage $V_{IN}$ 102 and provides a regulated output. In general, the output of the power converter 104 is an output voltage $V_O$ 108, output current $I_O$ 109, or a combination of the two. On the primary side 132 of the power converter 104 is a power switch S1 106, which is controlled by the primary controller 112. The primary controller 112 controls one or more switching parameters of the power switch S1 106 to control the amount energy transferred by the energy transfer element T1 137. It should be appreciated that the primary controller 112 shares many similarities with the similarly numbered first controller of FIG. 1A. At least one difference, however, is the primary controller 112 shown in FIG. 1B communicates with the secondary controller 121. As shown, the primary controller 112 can receive the request signal REQ 140 via a communication link 194 from the secondary controller 121. The communication link 194 provides galvanic isolation using an inductive coupling, such as a transformer or a coupled inductor, an optocoupler, capacitive coupling, or other device that maintains the galvanic isolation.

The primary controller 112 includes a drive signal generator 117, which is coupled to receive the request signal REQ 140 and outputs the first drive signal DR1 113 to control the switching of the primary power switch S1 106. As will be further discussed, the request signal REQ 140 is responsive to the sensed output OS 120 of the power converter 104. In one example, the first drive signal DR1 113 is a rectangular pulse waveform with varying durations of logic high and logic low sections. In one example, a logic high value in the first drive signal DR1 113 turns on the first power switch S1 106 while a logic low value turns off the first power switch S1 106. The duration of the logic high sections may be referred to as the on-time of the primary switch S1 106 while the duration of the logic low sections may be referred to as the off-time. The sum of the on-time and the off-time may be referred to as the switching period, which is the inverse of the switching frequency, of the primary power switch S1 106.

First controller 112 also includes a foldback circuit 116, which senses foldback or fault conditions. As shown, the foldback circuit 116 is coupled to receive an input voltage sense signal VIN_SENSE 115 representative of the input voltage $V_{IN}$ 102 and a temperature signal 114 representative of the temperature of one or more components of the first power converter 104. For example, the temperature signal 114 may be representative of the temperature of the first power switch S1 106, an energy transfer element of either power converter, secondary rectifiers, or a metal chassis which surrounds either power converters or both. In response to either the input voltage sense signal VIN_SENSE 115 or the temperature signal 114, the foldback circuit 116 outputs the foldback signal FC1 118 to the drive signal generator 117. In one example, the drive signal generator 117 may control the primary power switch S1 106 to reduce the amount of energy delivered by the energy transfer element T1 137 in response to the foldback signal FC1 118. In another example, the drive signal generator 117 may prevent the power switch S1 106 from switching in response to the foldback signal FC1 118. If the sensed temperature is too high or the input voltage VIN 102 is too low, the foldback circuit 116 outputs the foldback signal FC1 118 to the drive signal generator 117.

As shown, a secondary switch S3 136 is included on the secondary side 133 of power converter 104. One example of the secondary switch S3 136 could be synchronous rectifier or a passFET. The switching operation of secondary switch S3 136 is controlled by the secondary controller 121. An output sense circuit 119 is coupled to sense the output of the second power converter 107 to provide the output sense signal OS 120, which is also sometimes referred to as a feedback signal. The output sense signal OS 121 may be representative of the output voltage $V_O$ 116, an output current $I_O$ 117, or a combination of the two.

Secondary controller 121 is shown as including a comparator 122, drive signal generator 138, and foldback control 124. The second controller 121 is coupled to receive the output sense signal OS 120 at the comparator 122. Comparator 122 is further coupled to receive a regulation reference 131. As shown, the regulation reference 131 is received at the inverting input of comparator 122 while the output sense signal OS 120 is received at the non-inverting input of comparator 122. The output of comparator 122 is the regulation signal REG 127, and is representative of the value of the output sense signal OS 120 being above or below the regulation reference 121.

Secondary controller 121 shares many similarities with the second controller of FIG. 1A and similarly named and numbered elements couple and function as described above. At least one difference, however, is the secondary controller 121 includes a request control 139, which generates a request signal REQ 140 sent to the primary controller 112. Request control 139 is also coupled to receive the regulation signal REG 127 and outputs the request signal REQ 140. The request signal REQ 140 may include request events 193 that are generated in response to the regulation signal REG 127 and indicates that the primary controller 112 should turn on the primary power switch S1 106. The request signal REQ 140 may be a rectangular pulse waveform that pulses to a logic high value and quickly returns to a logic low value. The logic high pulses may be referred to as request events 193. The time between leading edges of the request events 193 (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 142 may be responsive to the output sense signal OS 120. In one example, the request frequency $f_{REQ}$ increases if the output sense signal OS 120 is less than the regulation reference REF 131 and decreases if the output sense signal OS 120 is greater than the regulation reference REF 131. As mentioned above, the drive signal generator 117 is coupled to receive the request signal REQ 140 and turns on the primary power switch S1 106 in response to the request events 193. It is generally understood that a switch that is closed may conduct current and is considered on, while a switch that is open cannot conduct current and is considered off.

Drive signal generator 138 is coupled to receive the regulation signal REG 127 and generates secondary drive signal DR3 141. The secondary drive signal DR3 141 controls the turn on and the turn off of the secondary switch S3 136. In one example, the secondary drive signal DR3 141 is a rectangular pulse waveform with varying durations of logic high sections and logic low sections. The logic high sections could correspond to a switch that is turned on while logic low sections could correspond to a switch that is turned off. To regulate the output provided to load 111, the secondary controller 121 may vary one or more switching parameters of the secondary switch S3 136 via the secondary drive signal DR3 141 in conjunction with sending the request signal REQ 140. Example parameters may include the on-time, off-time, and switching frequency/switching period. The various values which the secondary controller 121 may choose for the switching parameters may be referred to as the operational states.

Foldback control 124 is coupled to sense if the primary controller 112 is operating under foldback or fault conditions from the operation sense signal OPS 129, representative of the operational state of the secondary switch S3 136, and/or the regulation reference REF 131 to reduce the output of the second power converter 104. As will be further discussed, the regulation reference REF 131 is varied in response to the regulation signal REG 127 for a closed loop response to the indirectly sensed foldback condition. Foldback control 124 includes the foldback sense 125 and reference generator 126. The foldback sense 125 may indirectly sense primary foldback or fault by monitoring the operational state of the secondary drive signal DR3 141 and/or the regulation signal REG 127. Foldback sense 125 is coupled to receive the regulation signal REG 127 and determines that a foldback or fault condition exists if the output sense signal OS 120 is less than the regulation reference REF 131 for a threshold duration of time. The output sense signal OS 120 being less than the regulation reference REF 131 for a threshold duration of time may indicate that not enough energy is being delivered to the output of the power converter 104. The foldback sense 125 is also coupled to receive the operational sense signal OPS 129 and determines that a foldback or a fault condition exists if the second power switch S2 110 is controlled in one or more operational states for a threshold duration of time, indicating that not enough energy is being delivered to the output of the power converter 104.

Once a foldback or a fault condition has been sensed, the foldback sense 125 outputs an enable signal EN 130 to the reference generator 126 to vary the regulation reference 131. When the reference generator 126 is not enabled by the foldback sense 125, the reference generator 126 outputs a value for the regulation reference 131 that regulates the output of the power converter 104 to its initial value under normal operating conditions or other non-foldback operating conditions. Once enabled, the reference generator 126 varies the regulation reference REF 131 in response to the regulation signal REG 127 in a closed-loop manner. Under normal operating conditions, there is a general expected shape for the regulation signal REG 127. The shape of the regulation signal REG 127 varies once the power conversion system 100 is under foldback or fault conditions. The reference generator 126 varies the regulation reference REF 131 in response to the shape of the regulation signal REG 127 and is varied until the regulation signal REG 127 resembles the shape of the regulation signal REG 127 under normal operating conditions. In one example, the regulation reference REF 131 is reduced until the shape of the regulation signal is substantially similar to the shape of the regulation signal under normal operating conditions. The reduced regulation reference REF 131 also reduces the output of the second power converter 107 and foldback is applied to the entire power conversion system 100.

In one example, primary controller 112 and secondary controller 121 may be formed as part of an integrated circuit that is manufactured as either a hybrid or monolithic integrated circuit. In one example, the power switch S1 106 may also be integrated in a single integrated circuit package with the primary controller 112 and the secondary controller 121. In addition, in one example, primary controller 112 and secondary controller 121 may be formed as separate integrated circuits. The power switch S1 106 may also be integrated in the same integrated circuit as the primary controller 112 or could be formed on its own integrated circuit. Further, it should be appreciated that both the primary controller 112, the secondary controller 121, and power switch S1 106 need not be included in a single package and may be implemented in separate controller packages or a combination of combined/separate packages.

Figure 2A:
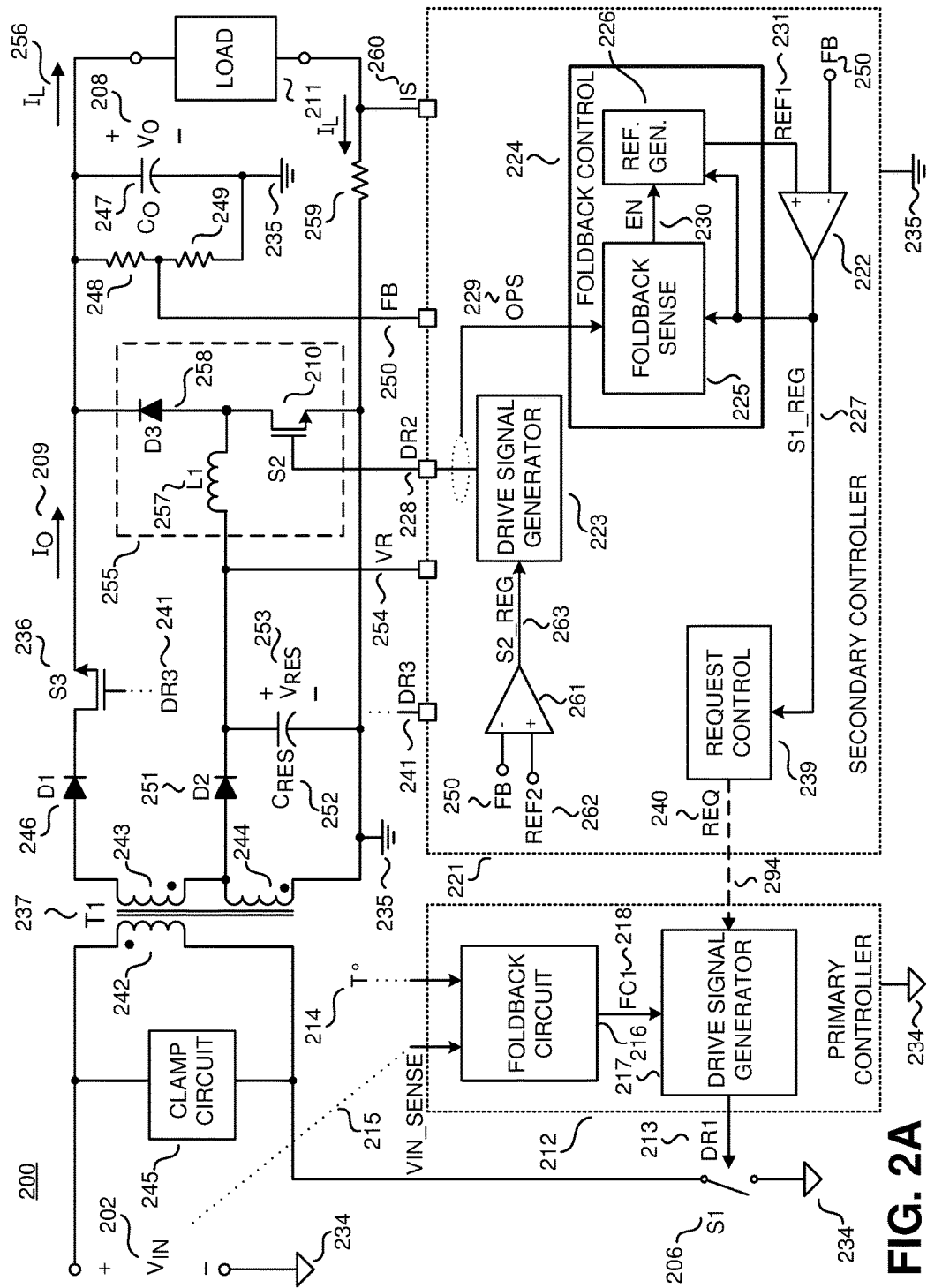
FIG. 2A is a schematic illustrating an example power converter with a secondary controller with foldback control, in accordance with embodiments of the present invention.

FIG. 2A illustrates another example switched mode power converter 200 that utilizes a secondary controller 221 with foldback control 124 in accordance with the teachings of the present invention. The example power converter 200 shown in FIG. 2A shares many of the same elements as the power conversion systems shown in FIGS. 1A and 1B and it should be understood that similarly named and numbered elements are coupled and function as discussed above. Power converter 200 of FIG. 2A includes a primary controller 212 and a secondary controller 221. At least one difference, however, is that the power converter 200 is a multi-output power converter including a first output and a second output. The energy transfer element T1 237 has a first output winding 243 coupled to the first output, and a second output winding 244 coupled to the second output. Power converter 200 includes a regulator circuit 255 coupled between the multiple outputs of power converter 200. Further, the secondary controller 221 receives multiple output sense signals OS as described above. The feedback signal FB 250, which is representative of the first output, and the reservoir sense VR 254, which is representative of the second output, may be examples of output sense signals OS. As shown, the primary controller 212 outputs a primary drive signal DR1 213 to control switching of power switch S1 206, which controls energy delivery from the primary side to the secondary side of the power converter 200. The secondary controller 221 outputs a secondary drive signal DR3 241 which controls the switching of pass switch S3 236 to control energy delivery to the first output of power converter 200 (e.g., output capacitor 247). Secondary controller 221 also outputs a second drive signal DR2 228, which controls the switching of power switch S2 210 to control energy delivery from the second output of power converter 200 (e.g., reservoir capacitor 252) to the first output of power converter 200 (e.g., output capacitor 247).

Power converter 200 provides output power to the load 211 from an unregulated input voltage $V_{IN}$ 202, which in one example is a rectified ac line voltage or a rectified and filtered ac line voltage. The input voltage $V_{IN}$ 202 is coupled to be received by the energy transfer element T1 237. The example energy transfer element T1 237 shown in FIG. 2A includes three windings, an input winding 242, a first output winding 243, and a second output winding 244. Coupled across the input winding 242 is the clamp circuit 245, which limits the maximum voltage across a power switch S1 206 that is coupled to the primary winding 242 and an input return 234 as shown.

Primary controller 217 includes the drive signal generator 217 that provides drive signal DR1 213 to open and close power switch S1 213. Drive signal DR1 213 may be a voltage or current signal. Similar to what was discussed above, the drive signal generator 217 turns on the power switch S1 206 in response to request events in the request signal REQ 240 from the secondary controller 221. Similar to above, primary controller 212 also includes a foldback circuit 216, which senses foldback or fault conditions. As shown, the foldback circuit 216 is coupled to receive an input voltage sense signal VIN_SENSE 215 representative of the input voltage $V_{IN}$ 202 and a temperature signal 214 representative of the temperature of one or more components of the first power converter 204. For example, the temperature signal 214 may be representative of the temperature of power switch S1 206.

In response to either the input voltage sense signal VIN_SENSE 215 or the temperature signal 214, the foldback circuit 216 outputs the foldback signal FC1 218 to the drive signal generator 217. In one example, the foldback circuit 216 asserts the foldback signal FC1 218 if the sensed temperature is too high or the input voltage VIN 202 is too low. Drive signal generator 217 may control the power switch S1 206 to reduce the amount of energy delivered by the energy transfer element T1 237 in response to the foldback signal FC1 218. In another example, the drive signal generator 217 may prevent the power switch S1 206 from turning on in response to the foldback signal FC1 218.

Output rectifier D1 246 is coupled to first output winding 243. A pass switch S3 236 is coupled to the output rectifier D1 246 and the output capacitor 247, which is the first output of power converter 200. The pass switch S3 236 opens and closes in response to secondary drive signal DR3 241 from the secondary controller 221 to provide a regulated output voltage $V_O$ 208, output current $I_O$ 209, or a combination of the two, to the load 211. In the example power converter 200, the output voltage 208 is positive with respect to an output return 235, which is galvanically isolated from the input return 234 by the energy transfer element T1 237. Secondary drive signal DR3 241 may be a voltage or a current signal. Resistors 248 and 249 are coupled in series across the output capacitor CO 247 and provide the feedback signal FB 250 to the secondary controller 543. As shown, the resistors 248 and 249 form a voltage divider for the output voltage $V_O$ 208. As such, the feedback signal FB 250 is representative of the output voltage $V_O$ 208.

Primary controller 212 and secondary controller 221 control the power switch S1 206 such that the input current of the power converter 200 is proportional to the input voltage $V_{IN}$ 202 by a factor that is substantially fixed throughout a half line period to maintain power factor. Further, the primary controller 212 and secondary controller 221 control the power switch S1 206 to regulate the output voltage $V_O$ 208, output current $I_O$ 209, or a combination of the two. As will be further discussed, the secondary controller 221 utilizes the feedback signal FB 250 and/or the reservoir sense VR 253 to determine when to switch the power switch S1 206. Further, secondary controller 221 may also utilize a current sense signal IS 260 representative of a load current $I_L$ 256 through load 211 to determine when to switch the power switch S1 206. Current sense resistor 259 may be coupled in series to the load 211 to provide the current sense signal IS 260.

When the instantaneous input power of the power converter 200 exceeds the demand of the load (plus some loss), the secondary controller 221 switches the pass switch S2 236 off to prevent the output voltage $V_O$ 208 from exceeding its desired value. In one example, the secondary controller 221 compares the feedback signal FB 250 to an output voltage reference, which may be one example of a regulation reference as discussed above, to determine when to turn on and turn off the pass switch S3 236. If the feedback signal FB 250 exceeds the output voltage reference, the secondary controller 221 may output the secondary drive signal DR3 241 to control the pass switch S3 236 to be off. If the feedback signal FB 250 is less than the output voltage reference, the pass switch S3 236 is controlled to be on. When pass switch S3 236 on first output winding 243 is open (i.e., off), surplus energy from the output produces a current in the second output winding 244 and second output rectifier D2 251 to store the surplus energy in reservoir capacitor CRES 252. As shown, the output rectifier D2 251 and reservoir capacitor CRES 252 are coupled across the second output winding 244. The reservoir voltage VRES 253 is the voltage across reservoir capacitor CRES 252 and is referenced to the output return 235. The secondary controller 221 receives a reservoir sense signal VR 254, representative of the reservoir voltage VRES 253, which is another example of an output sense signal OS as discussed above. In other examples, output rectifier D2 251 may be a switch driven by secondary controller 221.

Regulator circuit 255 is coupled between the reservoir capacitor CRES 252 and the output capacitor CO 247. Regulator circuit 255 may be a non-isolated power converter. The example of FIG. 2A illustrates a boost converter for regulator circuit 255. However, in another example, a buck converter could also be used for regulator circuit 255. For the example shown, an inductor L1 257 is coupled between the reservoir capacitor CRES 252 and power switch S2 210. Switch S2 210 is coupled to output return 235 while output rectifier D2 253 is coupled to inductor L1 257 and the output capacitor CO 247. For the buck converter example, the output capacitor CO 247 would be coupled to the second output winding 244 to provide output voltage $V_O$ 208 and output current $I_O$ 209 while the reservoir capacitor CRES 252 is coupled to the first output winding 243.

When the instantaneous input power is less than the demand of the load 211 plus the loss in the power conversion circuits, regulator circuit 255 receives current from the reservoir capacitor CRES 252 to supplement the energy delivered to the load 211. In one example, the reservoir voltage VRES 253 increases when the energy transfer element T1 237 is delivering more energy to the output of the power converter (i.e., load 518) than needed. The reservoir voltage VRES 253 is substantially constant when the energy transfer element T1 237 is delivering the energy needed to the output of the power converter, and the reservoir voltage VRES 253 decreases when the energy transfer element T1 237 is not delivering the energy needed. In other words, the reservoir voltage VRES 253 decreases when the regulator circuit 255 is pulling charge from the reservoir capacitor CRES 252. As such, the reservoir sense signal VR 254, representative of the reservoir voltage VRES 253, is also representative of the amount of energy delivered to the output of the power converter 200 and considered an output sense signal OS as discussed above.

Secondary controller 221 is shown as receiving the reservoir sense signal VR 254, feedback signal FB 250, and current sense signal IS 260. The secondary controller 221 outputs the secondary drive signal DR3 241 to control the secondary switch S3 236 and may also output the second drive signal DR2 228 to control the second power switch S2 210 of regulator circuit 255. Secondary controller 221 is similar to the secondary controller shown in FIGS. 1A and 1B and it should be appreciated that similarly named and numbered elements are coupled and function as described above. The secondary controller 221 is shown as having regulation signal generation circuitry including comparators 222 and 261, request control 239, drive signal generator 223, and foldback control 224.

Comparator 222 is coupled to receive the feedback signal FB 250 and the first reference REF1 231, also referred to as a regulation reference. As shown, the feedback signal FB 250 is received at the inverting input and the first reference REF1 231 is received at the non-inverting input of comparator 222. The output of comparator 222 is the primary regulation signal S1_REG 227, which is utilized to determine whether to switch the power switch S1 206 and the switching properties of power switch S1 206.

Similar to FIG. 1B, the primary regulation signal S1_REG 227 is received by request control 239, which generates a request signal REQ 240 sent to the primary controller 212. The request signal REQ 240 may include request events that are generated in response to the primary regulation signal S1_REG 227 and indicates that the primary controller 212 should turn on the primary power switch S1 206. The request signal REQ 240 may be a rectangular pulse waveform that pulses to a logic high value and quickly returns to a logic low value. The logic high pulses may be referred to as request events. The time between leading edges (or trailing edges) of the request events may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events may be responsive to the feedback signal FB 250, which is one example of an output sense signal OS.

In one example, the request frequency $f_{REQ}$ increases if the feedback signal FB 250 is less than the primary regulation reference REF1 231 and decreases if the feedback signal FB 250 is greater than the primary regulation reference REF1 231. As mentioned above, the drive signal generator 217 is coupled to receive the request signal REQ 240 and turns on the primary power switch S1 206 in response to the request events. In another example, the request control 239 can generate the request signal REQ 240 in response to the reservoir signal VR 254 or the current sense signal IS 240.

Comparator 261 is shown as receiving the feedback signal FB 250 and the secondary regulation reference REF2 262. The feedback signal FB 250 is received at the inverting input while the second regulation reference REF2 262 is received at the non-inverting input of comparator 261. The output of comparator 261 is the second regulation signal S2_REG 263, which is utilized to determine whether to switch the second power switch S2 210 and the switching parameters of the second power switch S2 210. Drive signal generator 223 is coupled to receive the second regulation signal S2_REG 263 and generates secondary drive signal DR2 228. The secondary drive signal DR2 228 controls the turn on and the turn off of the second power switch S2 210 (i.e., the power switch of the regulation circuit 255). In one example, the second drive signal DR2 210 is a rectangular pulse waveform with varying durations of logic high and logic low sections. The logic high sections could correspond to a switch that is turned on, while logic low sections could correspond to a switch that is turned off.

To regulate the output provided to load 211, the secondary controller 221 may vary one or more switching parameters of the second power switch S2 210 via the second drive signal DR2 210 in conjunction with sending the request signal REQ 240. Example parameters may include the on-time, off-time, and switching frequency/switching period. The various values that the secondary controller 221 (via the drive signal generator 223) may choose for the switching parameters may be referred to as the operational states. As will be further discussed with respect to FIGS. 2B and 2C, the drive signal generator 223 may include a state machine that determines the duty cycle of the second power switch S2 210 in response to the second regulation signal S2_REG 263. The state machine may be monitored to determine the operating conditions of the second power switch S2 210.

Primary and secondary controllers 212 and 221 may operate in a constant voltage region, a constant current region, and/or a constant power region. Constant voltage generally refers to regulating the output voltage $V_O$ 208 to a constant value while constant current refers to regulating the output current $I_O$ 209 to a constant, and similarly for constant power. Further, the primary and secondary controllers 212 and 221 may provide dimming for the load 211. The feedback signal FB 250 and the reservoir sense VR 254 may be utilized for constant voltage operation while the current sense IS 260 and the reservoir sense VR 254 may be used for constant current operation. For dimming, the current sense IS 260 and the reservoir sense VR 254 may be used.

Foldback control 224 is coupled to sense if the primary controller 212 is operating under foldback or fault conditions from the operation sense signal OPS 229, which is representative of the operational state of the second power switch S2 210, and/or the primary regulation signal S1_REG 227 to reduce the output of the power converter 200. As will be further discussed, the first regulation reference REF 231 is varied in response to the primary regulation signal S1_REG 227 for a closed loop response to the indirectly sensed foldback condition. Foldback control 224 includes the foldback sense 225 and reference generator 226. The foldback sense may indirectly sense primary foldback or fault by monitoring the operational state of the second drive signal DR2 210 and/or the primary regulation signal S1_REG 227.

Foldback sense 225 is coupled to receive the primary regulation signal REG 227 and determines that a foldback or fault condition exists if the feedback signal FB 250 is less than the first regulation reference REF1 231 for a threshold duration of time. The feedback signal FB 250 being less than the first regulation reference REF1 231 for the threshold duration of time may indicate that not enough energy is being delivered to the output of the power converter 200. In other words, the secondary controller 221 is requesting the primary controller 212 to turn on the power switch S1 206 but the output is still less than the first regulation reference REF1 231.

Foldback sense 225 is also coupled to receive the operational sense signal OPS 229 and determines that foldback or a fault condition exists if the second power switch S2 210 is controlled in one or more operational states for a threshold duration of time, indicating that not enough energy is being delivered to the output of the power converter 200. In the example shown, the regulation circuit 255 supplements the output of power converter 200 from the reservoir capacitor CRES 252 if the energy provided from the first output winding 243 is not sufficient to regulate the output. The second power switch S2 210 operating in one or more operational states for more than the threshold duration of time could indicate that the primary side of the power converter is not providing enough energy.

Once the foldback sense 225 determines there is a foldback or fault condition, the foldback sense 225 outputs an enable signal EN 230 to the reference generator 226 to vary the first regulation reference REF1 231. When the reference generator 226 is not enabled, the reference generator 226 outputs a value for the regulation reference 231 which regulates the output of the power converter 200 to its initial value under normal operating conditions or other non-foldback conditions. Once enabled, the reference generator 226 varies the first regulation reference REF1 231 in response to the primary regulation signal S1_REG 227 in a closed-loop manner. Under normal operating conditions, there is a general expected shape for the primary regulation signal S1_REG 227. The shape of the primary regulation signal S1_REG 227 varies once the power converter 200 is under foldback or fault conditions. The reference generator 226 varies the first regulation reference REF1 231 in response to the shape of the primary regulation signal S1_REG 227 and is varied until the primary regulation signal S1_REG 227 resembles the shape of the primary regulation signal S1_REG 227 under normal operating conditions. The varied first regulation reference REF 231 can reduce the output of the second power converter 200 and foldback is applied.

Figure 2B:
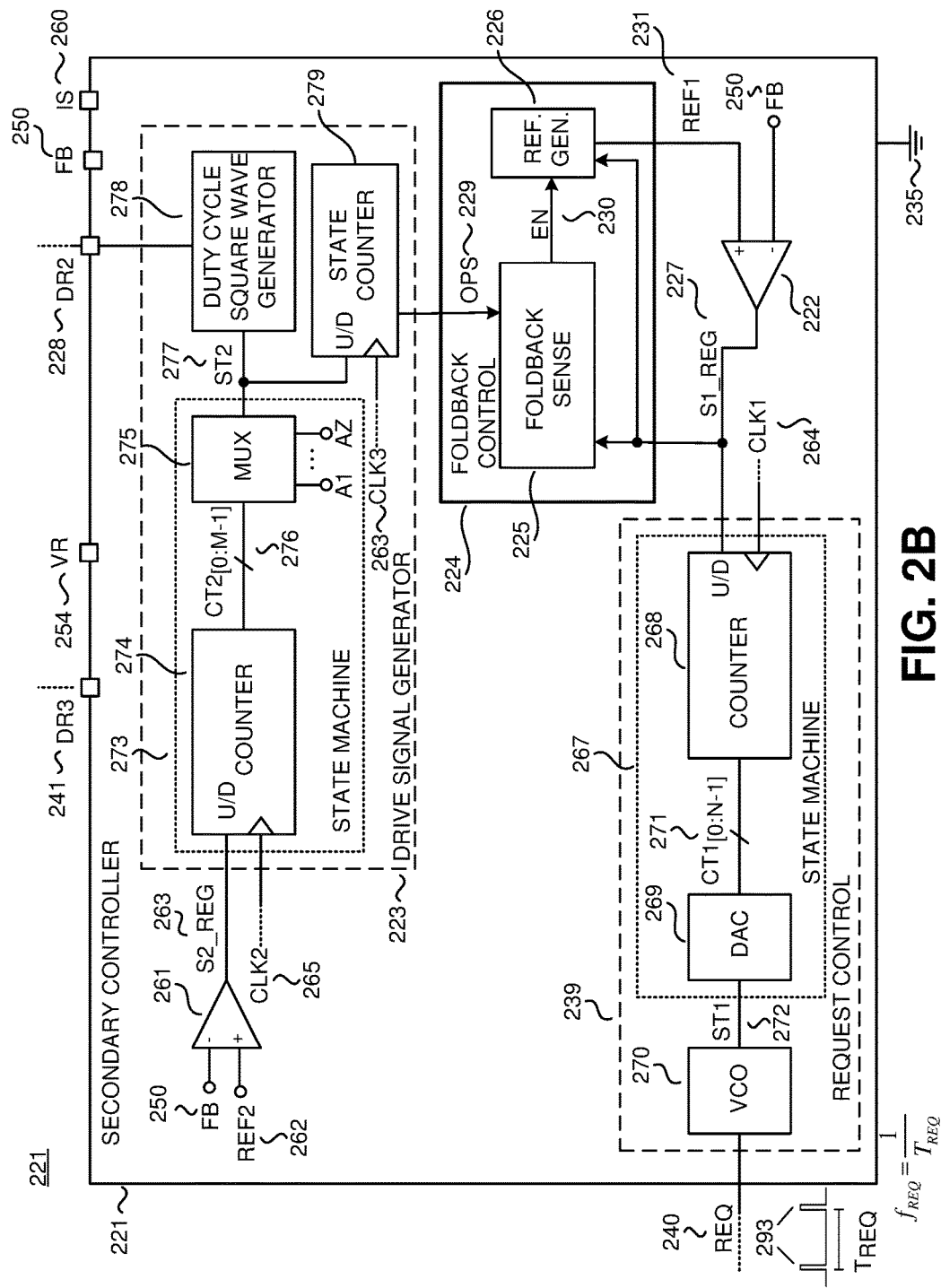
FIG. 2B is a schematic illustrating examples of the request control and drive signal generator of the secondary controller of FIG. 2A, in accordance with embodiments of the present invention.

FIG. 2B illustrates an example secondary controller 221 and it should be appreciated that similar named and numbered elements are coupled and function as described above. Specifically, FIG. 2B illustrates the drive signal generator 223 and request control 239 of secondary controller 221. In the example shown, request control 239 includes a state machine 267 and a voltage controlled oscillator (VCO) 270. State machine 267 is coupled to receive the output of comparator 222, which is that primary regulation signal S1_REG 227, and the first clock signal CLK1 264. The state machine 267 outputs the state signal ST1 272, which is representative of an operating state of the first power switch S1 206, to the VCO 270. In one example, the state signal ST 272 is representative of the switching frequency and/or on-time of the first power switch S1 206. State signal ST1 272 may be an analog signal representative of a digital value. The state machine 267 updates the state signal ST1 272 in response to the primary regulation signal S1_REG 227. The speed at which the state machine 267 updates is responsive to the frequency of the first clock signal CLK1 264.

State machine 267 is shown as including a counter 268 and digital-to-analog converter (DAC) 269. Counter 268 is coupled to receive the primary regulation signal S1_REG 227 at its U/D input and the first clock signal CLK1 264 at its clock input. The counter 268 outputs a first count signal CT1 271, which may be an N-bit digital signal. In operation, the counter 268 updates its internal count in response to the output of comparator 222 at a speed indicated by the first clock signal CLK1 264. The frequency of the first clock signal CLK1 264 may be fixed or variable, and in one example may be 5 kHz or 10 kHz. In one example, the counter 268 counts up when first regulation reference REF1 231 is greater than the feedback signal FB 250 and counts down when the feedback signal FB 250 is greater than the first regulations reference REF1 231. Alternatively, the counter 268 may count down when the first regulation reference REF1 231 is greater than the feedback signal FB 250 and counts up the feedback signal FB 250 is greater than the first regulations reference REF1 231. The first count signal CT1 271 may be the internal count of the counter 268.

DAC 269 is coupled to receive the first count signal CT1 271 and outputs the first state signal ST1 272. In operation, the DAC 269 determines the value for the first state signal ST1 272 from the received digital count signal CT1 271. In one example, the first state signal ST1 272 may be a voltage signal and the greater the first count signal CT1 271, the greater the voltage of the first state signal ST1 272. The first count signal CT1 271 (i.e., internal count of the counter 268) and the first state signal ST1 272 are representative of an operating condition of the first power switch S1 206. In one example, they may be representative of switching frequency (i.e., the request frequency $f_{REQ}$ of the request signal 240) and the on-time of the power switch S1 206. In one example, an increasing count signal CT1 271 and state signal ST1 272 may correspond to increasing switching frequency/request frequency $f_{REQ}$. In another example, a decreasing count signal CT1 271 and state signal ST1 272 may correspond to increasing switching frequency/request frequency $f_{REQ}$.

VCO 270 is coupled to receive the first state signal ST1 272 and outputs the request signal REQ 240. As mentioned above, the request signal REQ 240 may be a rectangular pulse waveform that pulses to a logic high value and quickly returns to a logic low value. The logic high pulses may be referred to as request events 293. The time between leading edges of the request events 293 (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request events 293 may be responsive to the value of the first state signal ST1 272. In one example, an increasing value of the first state signal ST1 272 may correspond to a decreasing request frequency $f_{REQ}$ (and ergo an increasing request period $T_{REQ}$). In another example, an increasing value of the first state signal ST1 272 may correspond to an increasing request frequency $f_{REQ}$ (and ergo a decreasing increasing request period $T_{REQ}$).

Request control 239 increases the request frequency $f_{REQ}$ of the request signal REQ 240 when the first regulation reference REF1 231 is greater than the feedback signal FB

250 and decreases the request frequency $f_{REQ}$ when the first regulation reference REF1 231 is less than the feedback signal FB 250. For the example of an increasing first count signal CT1 271 and first state signal ST1 272 when the first regulation reference REF1 231 is greater than the feedback signal FB 250 (i.e., counter 268 counts up when primary regulation signal S1_REG 227 is logic high), the VCO 270 translates the first state signal ST1 272 into a request frequency $f_{REQ}$. For the example of a decreasing first count signal CT1 271 and a decreasing first state signal ST1 272 when the first regulation reference REF1 231 is greater than the feedback signal FB 250 (i.e., counter 268 counts down when the primary regulation signal S1_REG 227 is logic high), the VCO 270 translates the first state signal ST1 272 into a request period $T_{REQ}$.

Drive signal generator 223 includes a state machine 273, a variable duty cycle square wave generator 278, and state counter 279. State machine 273 is coupled to receive the output of comparator 261, which is the second regulation signal S2_REG 263, and the second clock signal CLK2 265. The state machine 273 outputs the second state signal ST2 277, which is representative of an operating state of the second power switch S2 210. In one example, the second state signal ST2 277 is representative of the on-time of the second power switch S2 210. Second state signal ST2 277 may be an analog signal representative of a digital value. The state machine 273 updates the second state signal ST2 277 in response to the second regulation signal S2_REG 263. The speed at which the state machine 273 updates is responsive to the frequency of the second clock signal CLK2 265. In one example, the second clock signal CLK2 265 is substantially equal to 200 kHz.

State machine 273 is shown as including a counter 274 and multiplexer (MUX) 275. Counter 274 is coupled to receive the second regulation signal S2_REG 263 at its U/D input and the second clock signal CLK2 265 at its clock input. The counter 274 outputs a second count signal CT2 276, which may be an M-bit digital signal. In operation, the counter 274 updates its internal count in response to the output of comparator 261 at a speed indicated by the second clock signal CLK2 265. In one example, the counter 274 counts up when second regulation reference REF2 262 is greater than the feedback signal FB 250 and counts down when the feedback signal FB 250 is greater than the second regulation reference REF2 262. Alternatively, the counter 268 may count down when the second regulation reference REF2 262 is greater than the feedback signal FB 250 and counts up the feedback signal FB 250 is greater than the second regulations reference REF2 262. The second count signal CT2 276 may be the internal count of the counter 274.

MUX 275 is coupled to receive the second count signal CT2 276 and outputs the second state signal ST2 277. The MUX 276 also receives a plurality (Z) of discrete reference values, A1 to AZ, which may be voltage values. The references values, A1 to AZ, may give rise to a unique, discrete duty cycle or on-time of the second power switch S2 210. In operation, the MUX 276 selects the value for the second state signal ST2 277 from one of the reference values, A1 to AZ, in response to the received digital count signal CT2 276. A first range of values for the second count signal CT2 276 corresponds to selecting reference value A1, a second range of values for the second count signal CT2 276 reference value A2, and so on until the reference value AZ. In one example, each subsequent reference value is greater than the previous reference value, with reference value AZ being the highest.

The second state signal ST2 277 may be a voltage signal. In one example, the greater the second count signal CT2 276, the greater the voltage of the second state signal ST2 277. In another example, the greater the second count signal CT2 276, the smaller the voltage of the second state signal ST2 277. The second count signal CT2 276 (i.e., the internal count of the counter 274) and the second state signal ST2 277 are representative of an operating condition of the second power switch S2 210. In one example, they may be representative of the duty cycle and/or on-time of the second power switch S2 210. In one example, an increasing state signal ST2 277 could correspond to an increasing duty cycle and/or on-time of the second power switch S2 210.

Variable duty cycle square wave generator 278 is coupled to receive the second state signal ST2 277 and outputs the second drive signal DR2 228. In operation, the duty cycle square wave generator 278 varies the duty cycle of the second drive signal DR2 228 (and ergo the on-time of the second power switch S2 210) in response to the value of the second state signal ST2 277. In one example, the greater the value of the second state signal ST2 277, the greater the duty (and ergo the on-time) of the second power switch S2 210.

State counter 279 is coupled to receive the second state signal ST2 277 at its U/D input and the third clock signal CLK3 263 at its clock input. The state counter 279 outputs the operation sense signal OPS 229 to foldback control 224. One example of the operation sense signal OPS 229 will be discussed with respect to FIG. 3B. In operation, the state counter 279 updates its internal count in response to the second state signal ST2 277 at a speed indicated by the third clock signal CLK3 263. In one example, the third clock signal CLK 263 may be 1 kHz. The third clock signal CLK3 263 may be generated from the second clock signal CLK2 265. In one example, the state counter 279 counts down when the value of the second state signal ST2 277 is equal to reference value A1 of MUX 275 and counts up for any other reference value of MUX 275 (A1 through AZ). The operation sense signal OPS 229 is the internal count of state counter 279. As such, the operation sense signal OPS 229 is representative of the operational state of the second power switch S2 210.

Figure 2C:
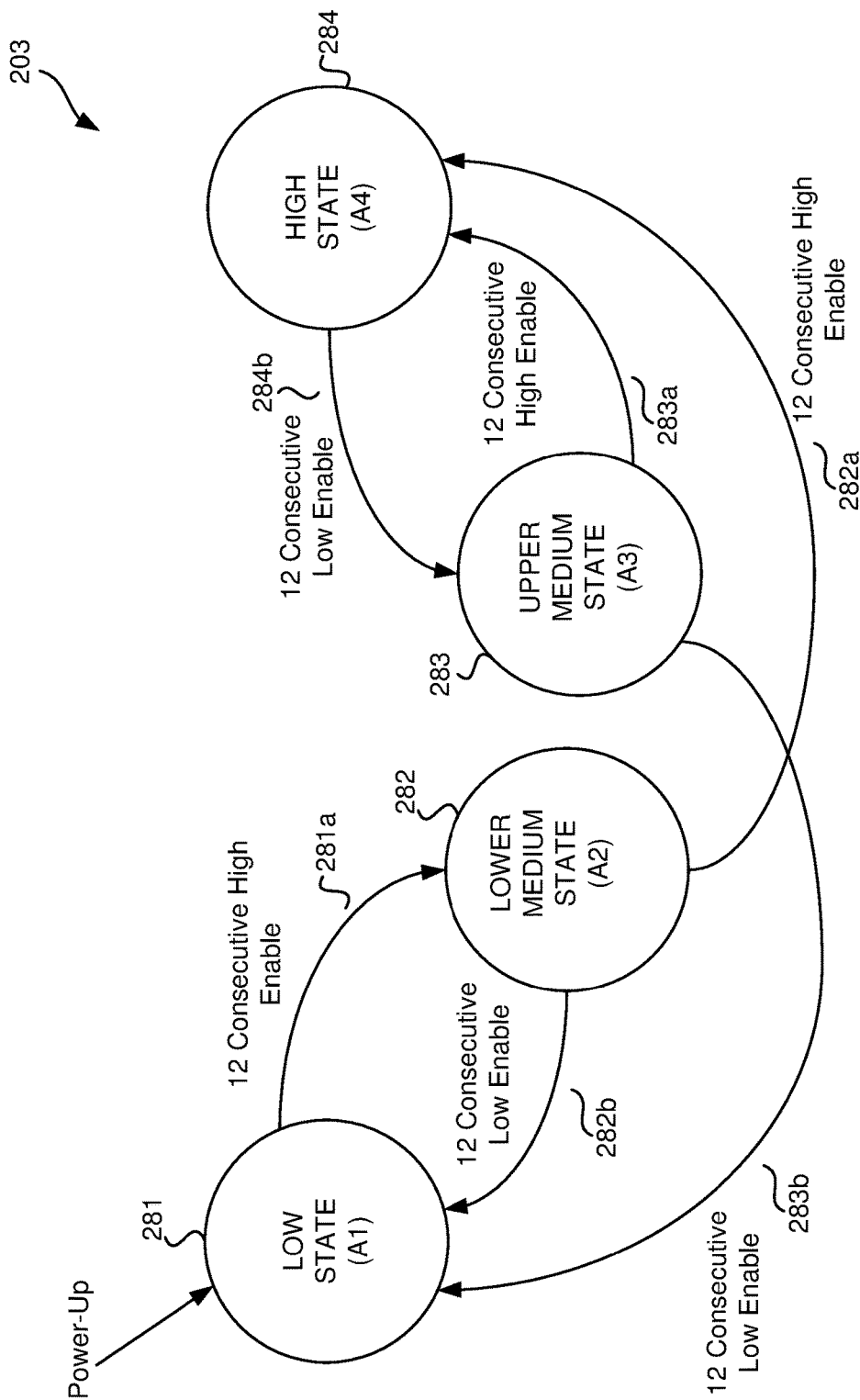
FIG. 2C is a diagram illustrating an example state diagram for a state machine of the drive signal generator of FIG. 2B, in accordance with embodiments of the present invention.

FIG. 2C illustrates an example state diagram 203 of the state machine 273. For the example shown, the state diagram 203 has four states, which correspond to four discrete reference values for the MUX 275 (i.e., Z=4, A1<A2<A3<A4). The state diagram 203 includes a low state 281, a lower medium state 282, an upper medium state 283, and a high state 284. According to the state diagram 203, a transition from the low state 281 to the lower medium state 282 can occur under a transition condition 281a, and a transition from the lower medium state 282 to the low state 281 can occur under a transition condition 282b. Also, a transition from the upper medium state 283 to the high state 284 can occur under a transition condition 283a, and a transition from the high state 284 to the upper medium state 283 can occur under a transition condition 284b. Additionally, a transition from the lower medium state 282 to the high state 284 can occur under a transition condition 282a, and a transition from the upper medium state 234 to the low state 281 can occur under a transition condition 283b.

With reference to FIGS. 2B-2C, the state machine 273 begins at the low state 281 after power up. When the state machine is in the low state 281, the MUX 275 selects reference value A1 and the second state signal ST2 is substantially equal to reference value A1. If the feedback signal FB 250 is greater than the second regulation reference REF2 262 for twelve consecutive cycles of the second clock signal CLK2 265 (i.e., transition condition 281*a*), the state machine 273 transitions to the lower medium state 282 and the MUX 275 selects reference value A2 and the second state signal ST2 277 is substantially equal to reference value A2. While in the lower medium state A2, if the feedback signal FB 250 is less than the second regulation reference REF2 262 for twelve consecutive cycles of the second clock signal CLK2 265 (i.e., transition condition 282*b*), the state machine 273 returns to the low state 281. Under steady state conditions, the state machine 273 should toggle between the low state 281 and the lower medium state 282.

The state machine 273 transitions from the lower medium state 282 to the high state 284 if the feedback signal FB 250 is greater than the second regulation reference REF2 262 for twelve consecutive cycles of the second clock signal CLK2 265 (i.e., transition condition 282*a*). In the high state 284, MUX 275 selects reference value A4 and the second state signal ST2 277 is substantially equal to reference value A4. From the high state 284, the state machine can transition to the upper medium state 283 if feedback signal FB 250 is less than the second regulation reference REF2 262 for twelve consecutive cycles of the second clock signal CLK2 265 (i.e., transition condition 284*b*). In the upper medium state 283, the MUX 275 selects reference value A3 and the second state signal ST2 277 is substantially equal to reference value A3. The state machine 273 can return to the high state 284 from the upper medium state 283 if the feedback signal FB 250 is greater than the second regulation reference REF2 262 for twelve consecutive cycles of the second clock signal CLK2 265 (i.e., transition condition 283*a*). From the upper medium state 283, the state machine 273 can return to the low state 281 if the feedback signal FB 250 is less than the second regulation reference REF2 262 for twelve consecutive cycles of the second clock signal CLK2 265 (i.e., transition condition 283*b*). It is noted that the example state diagram 203 utilizes twelve consecutive cycles for the transition conditions, but it should be appreciated that in other examples, any number of cycles could be used for the transition conditions in accordance with the teachings of the present invention.

Figure 3A:
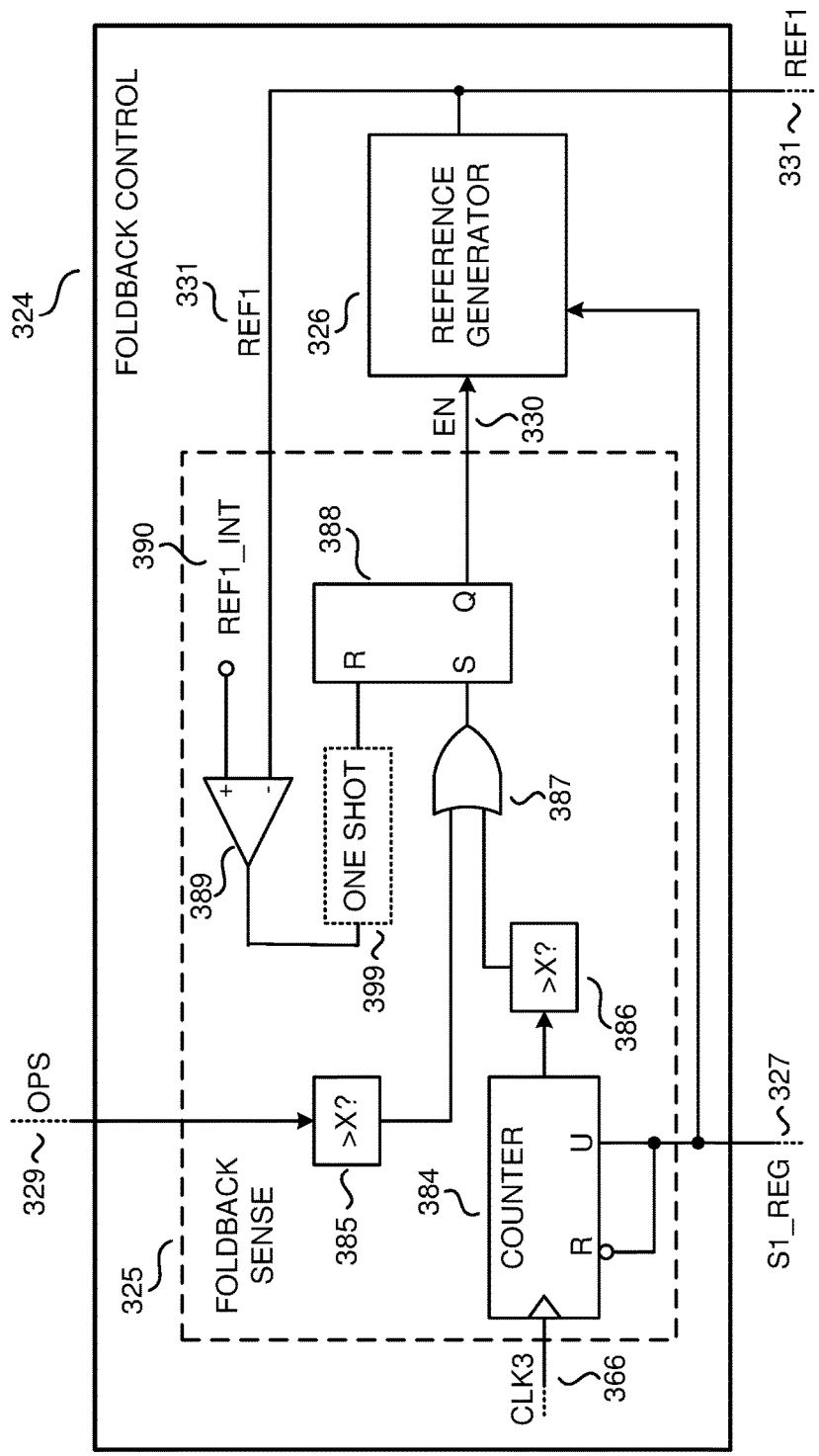
FIG. 3A is a schematic illustrating an example foldback sense of the foldback control of FIG. 2A, in accordance with embodiments of the present invention.

FIG. 3A illustrates an example foldback sense 325 of foldback control 324 in accordance with the teachings of the present invention. The foldback control 324, foldback sense 325, and reference generator 326 illustrated in FIG. 3A are one example of foldback control 224, foldback sense 225, and reference generator 226 discussed with respect to FIGS. 2A, 2B and 2C, and it should be appreciated that similarly named and numbered elements couple and function as described above. In the example shown in FIG. 3A, foldback sense 325 is also coupled to receive the first regulation reference REF1 331 from the reference generator 326 and the third clock signal CLK3 366.

Foldback sense 325 is shown as including counter 384, digital comparators 385 and 386, OR gate 387, latch 388, and comparator 389. Foldback sense may also optionally include a monostable multivibrator (one shot) 399. Counter 384 is coupled to receive the primary regulation signal S1_REG 327 at its up input and the third clock signal CLK 366 and its clock input. Counter 384 also receives the inverted primary regulation signal S1_REG 327 at its reset input (as shown by the small circle at the reset input). In operation, the counter 384 counts up at a speed determined by the third clock signal CLK3 366 when the primary regulation signal S1_REG 327 indicates that the feedback signal FB is less than the first regulation reference REF1 331 (i.e., S1_REG 327 is logic high). The internal count of counter 384 is reset to zero when the feedback signal FB is greater than the first regulation reference REF1 331 (i.e., S1_REG 327 is logic low). The output of counter 384 is received by digital comparator 386, which compares the internal count of counter 384 to a threshold value X.

Digital comparator 385 is coupled to receive the operation sense signal OPS 329. As discussed above, the operation sense signal OPS 329 is the output of the state counter 279 and is representative of the operational state of the second power switch S2 210. In operation, the digital comparator 385 compares the operation sense signal OPS 329 with the threshold value X. The outputs of digital comparators 385 and 386 are logic high if the operation sense signal OPS 329 or the internal count of counter 384 is greater than the threshold value X. For the examples shown in FIGS. 2B and 3A, both the state counter 279 and the counter 384 are clocked by the third clock signal CLK3 366. As such, a logic high output by digital comparator 385 is representative of the state machine 273 being in either the lower medium state 282, upper medium state 283, or the high state 284 for at least threshold value X times the period of the third clock signal CLK3 366 (i.e., $X*T_{CLK3}$) more than the state machine 273 is in the low state 281. Similarly, a logic high output by digital comparator 385 is representative of the feedback signal FB being less than the first regulation reference REF1 331 for at least threshold value X times the period of the third clock signal CLK3 366 (i.e., $X*T_{CLK3}$). It is noted that the threshold value X for digital comparators 385 and 386 is illustrated as being the same, but it should be appreciated that in other examples, the threshold values for digital comparators 385 and 386 could be different threshold values in accordance with the teachings of the present invention.

OR gate 387 is coupled to receive the outputs of both digital comparators 385 and 386. The output of OR gate 387 is coupled to be received by the latch 388. Specifically, the output of OR gate 387 is received at the set input of latch 388. The output of latch 388 is the enable signal EN 330, which enables the reference generator 326 to vary the first regulation reference REF1 331 and places the secondary controller into a foldback response. In operation, latch 388 is set and the enable signal EN 330 is asserted when either the operation sense signal OPS 329 is greater than threshold value X or the internal count of counter 384 is greater than threshold value X. In other words, the enable signal EN 330 is asserted when the foldback sense determines there is a foldback or fault condition.

As mentioned above, the reference generator 326 is coupled to receive the enable signal EN 330. When the reference generator 326 is not enabled, the reference generator 326 outputs a value for the first regulation reference REF1 331, which regulates the output of the power converter 200 to its initial value under normal operating conditions or other non-foldback operating conditions. In other words, the first regulation reference REF1 331 is substantially equal to the value REF1_INT 390. When the enable signal EN 330 is asserted, the reference generator 326 varies the first regulation reference REF1 331 in response to the primary regulation signal S1_REG 327 in a closed-loop manner. Under normal operating conditions, there is a general expected shape for the primary regulation signal S1_REG 327. The shape of the primary regulation signal S1_REG 327 varies once the power converter is under foldback or fault conditions. The reference generator 326 varies the first regulation reference REF1 331 in response to the shape of the primary regulation signal S1_REG 327 and is varied until the primary regulation signal S1_REG 327 resembles the shape of the primary regulation signal S1_REG 227 under normal operating conditions. When the reference generator 326 is asserted, the secondary controller is operating in foldback.

Comparator 389 is coupled to receive the first regulation reference REF1 331 at its inverting input and receives the value REF1_INT 390 at its non-inverting input. The value REF1_INT 390 is representative of the value for the first regulation reference REF1 331 when the power converter is operating under normal operating conditions or other non-foldback operating conditions. The output of comparator 389 is received at the reset input of latch 388. Once the reference generator 326 is enabled, if the varied first regulation reference REF1 331 reaches the value REF1_INT 390, the latch 388 is reset and the enable signal EN 330 is deasserted. As such, the reference generator 326 is not enabled and the secondary controller is not operating in foldback. Optionally, a one shot 399 may be coupled between the comparator 389 and the reset input of latch 388. In response to the first regulation reference REF1 331 reaching the value REF1_INT 390, the one shot 399 outputs a pulse to reset the latch 388. How the first regulation reference REF1 is varied will be further discussed below with respect to FIGS. 4A, 4B, and 4C.

Figure 3B:
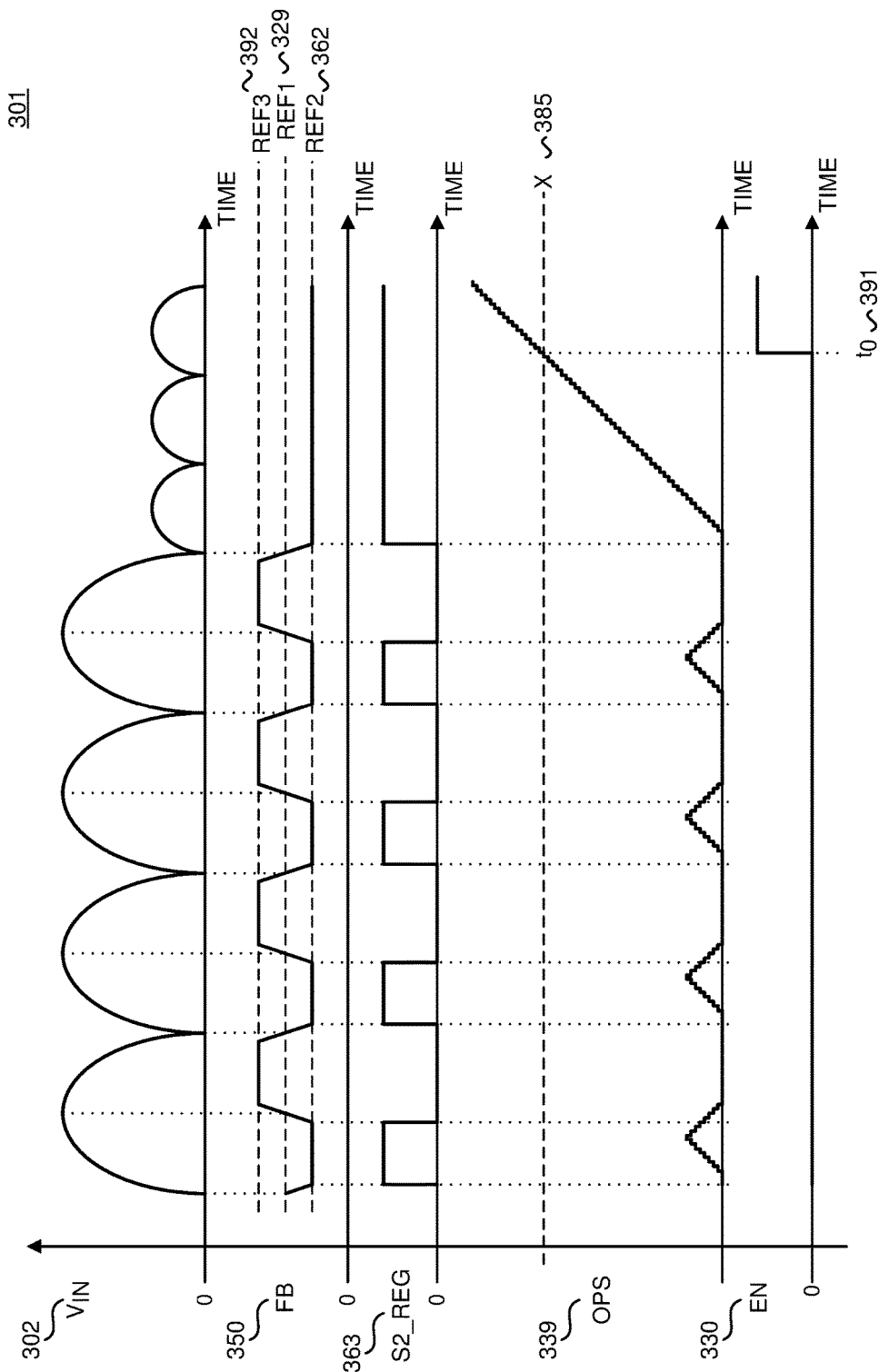
FIG. 3B is a timing diagram illustrating one example to sense a foldback condition, in accordance with embodiments of the present invention.
Figure 3C:
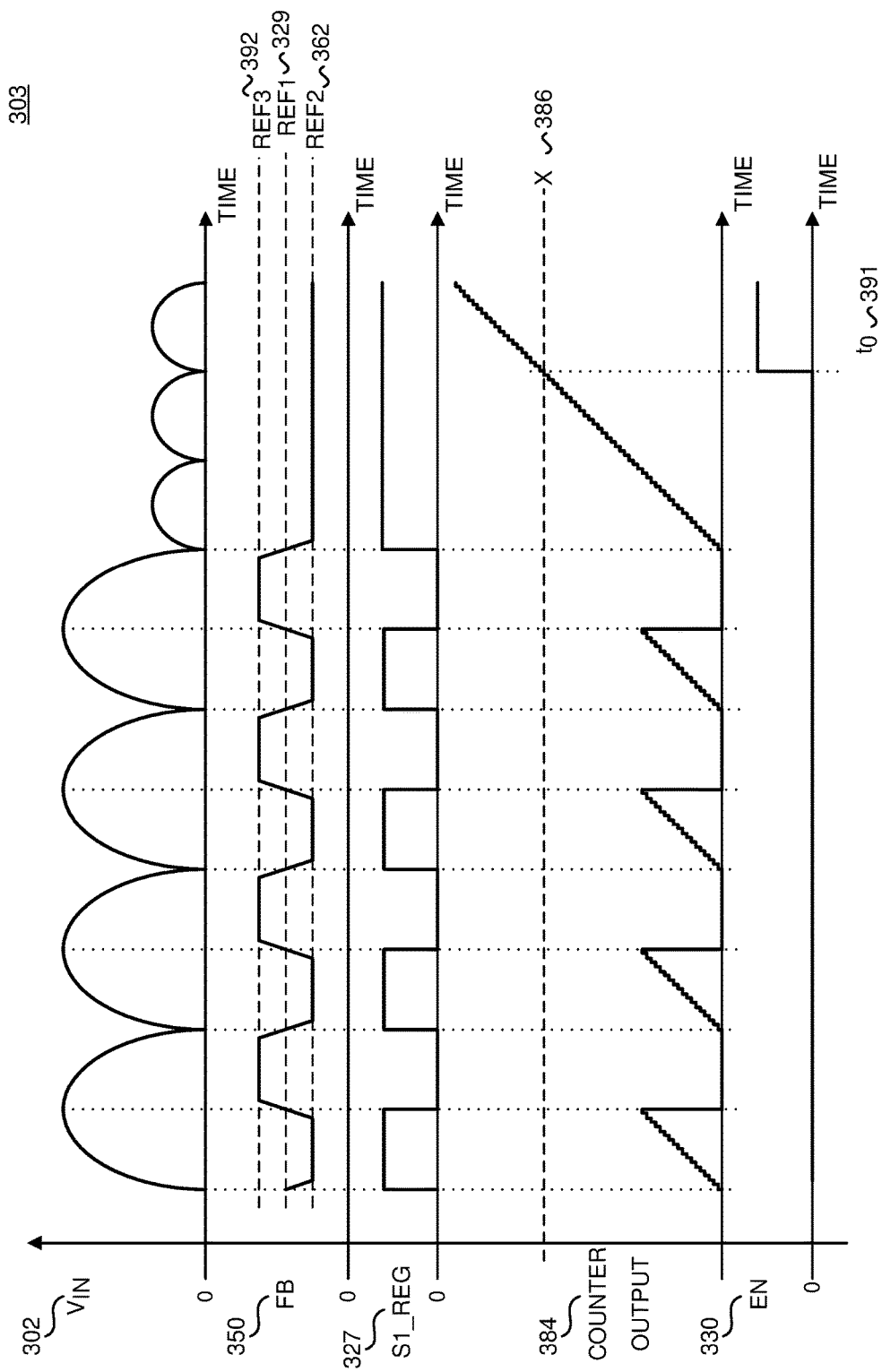
FIG. 3C is a timing diagram illustrating another example to sense a foldback condition, in accordance with embodiments of the present invention.

FIGS. 3B and 3C show example timing diagrams 301 and 303, which illustrate an example of how the foldback sense 325 asserts the enable signal EN 330 in response to the operation sense signal OPS 325 (FIG. 3B) and the primary regulation signal S1_REG 327 (FIG. 3C). It should be appreciated that similarly named and numbered elements couple and function as described above.

Both FIGS. 3B and 3C illustrate several half line cycles of the input voltage $V_{IN}$ 302, an example feedback signal FB 350, and the resultant second regulation signal S2_REG 363. During the first four half line cycles of the input voltage $V_{IN}$ 302 as shown in FIGS. 3B and 3C, the feedback signal FB 350 is regulated around the first regulation reference REF1 329. Further, the feedback signal FB 350 is regulated such that it does not fall below the second regulation reference REF2 362 or increase above a third regulation reference REF3 392. The first four half line cycles of input voltage $V_{IN}$ 302 are representative of typical steady state conditions for the power converter 200 of FIG. 2A. As shown, the feedback signal FB 350 is generally less than the first regulation reference REF1 329 for half of the half line cycle of input voltage $V_{IN}$ 302 and greater than the first regulation reference REF1 329 for the other half of the half line cycle of input voltage $V_{IN}$ 302. The second regulation signal S2_REG 363 is logic high when the feedback signal FB 350 is substantially equal to the second regulation reference REF2 362.

The operation sense signal OPS 339 is the output of the state counter 279 shown in FIG. 2B. The state counter 279 decreases its internal count when the value of the second state signal ST2 277 is equal to reference value A1 and counts up for any other value of the second state signal ST2 277 and the internal count of the state counter 279 does not drop below zero. The example operation sense signal OPS 339 is the analog representation of the internal count of state counter 279. Under steady state conditions, when the second regulation signal S2_REG 363 initially transitions to the logic high value (i.e., leading edge), the state machine 273 is in the low state 281 and the second state signal ST2 277 is substantially the reference value A1. As such, the operation sense signal OPS 339 is substantially zero while the state machine 273 is in the low state 281. The operation sense signal OPS 339 begins to increase when the state machine 273 leaves the low state 281 for the lower medium state 282. Under steady state conditions, the state machine 273 toggles between the low state 281 and the lower medium state 282. As shown, when the state machine 273 returns to the low state 281, the operation sense signal OPS 339 begins to count down. Operation sense signal OPS 339 continues to decrease even after the second regulation signal S2_REG 363 is logic low since the state machine 273 remains in the low state 281 and the state counter 279 counts down. Once the state counter 279 counts down to zero, the operation sense signal OPS 339 remains at zero. The speed at which the operation sense signal OPS 339 increases or decreases is responsive to the frequency of the third clock signal CLK3 263. For these first four half line cycles of the input voltage $V_{IN}$ 302, the operation sense signal OPS 339 does reach the threshold value X 385 (digital comparator 385 of FIG. 3A) and the enable signal EN 330 is not asserted.

From the fifth half line cycle onward of the input voltage $V_{IN}$ 302, the input voltage $V_{IN}$ 302 shown is illustrative of a line foldback condition. The feedback signal FB 350 falls to the second regulation reference REF2 362 and remains at the second regulation reference REF2 362 because the input voltage $V_{IN}$ 302 has decreased. The second regulation signal S2_REG 363 is logic high for a much longer duration of time as compared to the previous four half line cycles of input voltage $V_{IN}$ 302. The operation sense signal OPS 339 is substantially zero while the state machine 273 is in the low state 281 after the leading edge of the second regulation signal S2_REG 363. The operation sense signal OPS 339 increases as the state machine 273 leaves the low state 281. Since the second regulation signal S2_REG 363 remains logic high, the operation sense signal OPS 339 keeps increasing as the state machine 273 reaches the high state 284. Once the operation sense signal OPS 339 reaches the threshold value X 385 (at time to 391), the enable signal EN 330 is asserted and transitions to a logic high value (output of digital comparator 385 of FIG. 3A).

FIG. 3C illustrates asserting the enable signal EN 330 in response to the primary regulation signal S1_REG 327 and the primary counter 384. As shown, the primary regulation signal S1_REG 327 is logic high when the feedback signal FB 350 is less than the first regulation reference REF1 329. When the primary regulation signal S1_REG 327 is logic high, the primary counter 384 counts up and the counter output 384 increases. When the primary regulation signal S1_REG 327 transitions to a logic low value, the primary counter 384 is reset and the counter output 384 falls to zero. For the first four half line cycles of the input voltage $V_{IN}$ 302, the counter output 384 does not reach the threshold value X 386 (digital comparator 386 of FIG. 3A) and the enable signal EN 330 is not asserted.

From the fifth half line cycle onward of the input voltage $V_{IN}$ 302, the input voltage $V_{IN}$ 302 shown is illustrative of a line foldback condition. The feedback signal FB 350 falls to the second regulation reference REF2 362 and remains at the second regulation reference REF2 362 because the input voltage $V_{IN}$ 302 has decreased. The primary regulation signal S1_REG 327 is logic high for a much longer duration of time as compared to the previous four half line cycles of input voltage $V_{IN}$ 302. The primary counter 384 continues to increase while the primary regulation signal S1_REG 327 is logic high and the counter output 384 reaches the threshold value X 386 (digital comparator 386 of FIG. 3A) at time to 391. Once the counter output 384 reaches the threshold value X 386, the enable signal EN 330 is asserted and transitions to a logic high value.

Figure 4A:
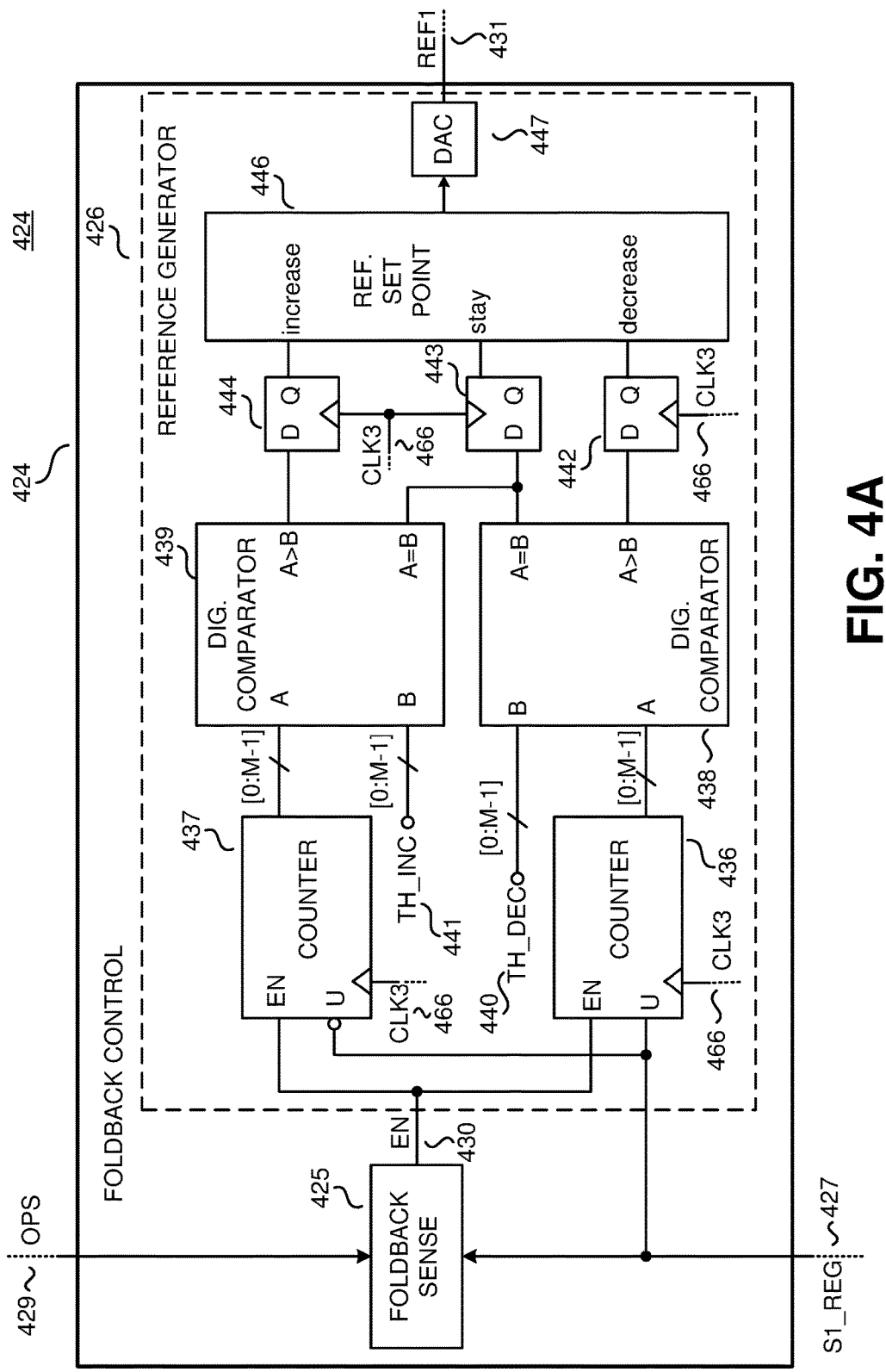
FIG. 4A is a schematic illustrating an example reference generator of the foldback control of FIG. 2A, in accordance with embodiments of the present invention.

FIG. 4A illustrates an example reference generator 426 of foldback control 424 in accordance with the teachings of the present invention. The foldback control 424, foldback sense 425, and reference generator 426 illustrated in FIG. 4A are examples of the foldback control, foldback sense, and reference generator discussed above with respect to FIGS. 2A, 2B, 2C, 3A, 3B, and 3C, and it should be appreciated that similarly named and numbered elements couple and function as described above.

As shown in the example depicted in FIG. 4A, foldback control 424 includes the foldback sense 425 and reference generator 426. The foldback sense 425 determines if a foldback or fault condition exists from the operation sense signal OPS 429 and/or the primary regulation signal S1_REG 427. Foldback sense 425 outputs the enable signal EN 430 to the reference generator 426. If the reference generator 426 is not enabled by the enable signal EN 430, the reference generator 426 outputs a value for the first regulation reference REF1 431, which enables the power converter to regulate to its initial value at normal operating conditions or other non-foldback operating conditions. An asserted enable signal EN 430 enables the reference generator 426 to vary the first regulation reference REF1 431 in a closed loop manner in response to the first regulation signal S1_REG 427. As mentioned above, once the reference generator 426 is enabled, the first regulation reference REF1 431 is varied such that the shape of the first regulation signal S1_REG 427 approximates the shape of the first regulation signal S1_REG 427 under normal operating conditions.

Reference generator 426 includes counters 436 and 437, digital comparators 438 and 439, flip-flops 442, 443, and 444, reference set point 446, and digital-to-analog converter (DAC) 447. Counters 436 and 437 are coupled to receive the enable signal EN 430 at their enable inputs and are enabled to increment or decrement its internal count when the enable signal EN 430 is asserted. Counter 436 is coupled to receive the first regulation signal S1_REG 427 at its up input and the third clock signal CLK3 466 at its clock input. When enabled, counter 436 increments its internal count when the feedback signal FB is less than the first regulation reference REF1 431 (i.e., first regulation signal S1_REG 427 is logic high) at a speed determined by the frequency of the third clock signal CLK3 466. Similarly, counter 437 is coupled to receive the inverse of the first regulation signal S1_REG 427 at its up input (as shown by the small circle) and the third clock signal CLK3 466 at its clock input. When enabled, counter 437 increments its internal count when the feedback signal FB is greater than the first regulation reference REF1 431 (i.e., the inverse of the first regulation signal S1_REG 427 is logic high). The internal counts of counters 436 and 437 may be M-bit digital signals and are outputted to digital comparators 438 and 439, respectively.

Digital comparator 438 is coupled to receive the output of counter 436 at its A input and a decrement threshold TH_DEC 440 at its B input. Decrement threshold TH_DEC 440 may be an M-bit digital word. The digital comparator 438 illustrated has two outputs, an A=B output, which is asserted when the output of counter 436 is substantially equal to the decrement threshold TH_DEC 440, and an A>B output, which is asserted when the output of counter 436 is greater than the decrement threshold TH_DEC 440.

Digital comparator 439 is coupled to receive the output of counter 437 at its A input and an increment threshold TH_INC 441 at its B input. Increment threshold TH_INC 441 may be an M-bit digital word. The digital comparator 439 has two outputs, an A=B output, which is asserted when the output of counter 437 is substantially equal to the increment threshold TH_INC 441, and an A>B output, which is asserted when the output of counter 437 is greater than the increment threshold TH_INC 441.

Flip-flops 442, 443, and 444 are all coupled to receive the third clock signal CLK3 466 at their respective clock inputs. Flip-flop 442 is coupled to receive the A>B output of digital comparator 438 at its D input, flip-flop 443 receives the A=B output of both digital comparators 438 and 439 at its D input, and flip-flop 444 receives the A>B output of digital comparator 439 at its D input.

Reference set point 446 is coupled to receive the outputs of flip-flops 442, 443, and 444. As shown, the reference set point 446 stores the digital word of the first regulation reference REF1 431. The output of the reference set point 446 is received by a DAC 447, which converts the digital word to the first regulation reference REF1 431. As shown in the depicted example, the reference set point 446 is coupled to receive the output of flip-flop 444 at its "increase" input, the output of flip-flop 443 at its "stay" input, and the output of flip-flop 442 at its "decrease" input.

In operation (and as will be shown further with FIGS. 4A and 4B), the reference generator 426 varies the first regulation reference REF1 431 in response to whether the first regulation signal S1_REG 427 has reached either the decrement threshold TH_DEC 440 or the increment threshold TH_INC 441. As shown, if the first regulation signal S1_REG 427 is logic high (i.e., feedback signal FB is less than the first regulation reference REF1 431) for a long enough duration of time such that the internal count of counter 436 is greater than the decrement threshold TH_DEC 440, the A>B output of digital comparator 438 is asserted and the reference set point 446 will decrement the first regulation reference REF1 431.

Similarly, if the first regulation signal S1_REG 427 is logic low (i.e., feedback signal FB is greater than the first regulation reference REF1 431) for a long enough duration of time such that the internal count of counter 437 is greater than the increment threshold TH_INC 441, the A>B output of digital comparator 439 is asserted and the reference set point 447 will increment the first regulation reference REF 431.

The reference set point 446 does not increment or decrement the first regulation reference REF1 431 when either the A=B output of comparators 438 or 439 are asserted. In other words, the reference set point 446 does not vary the first regulation reference REF1 431 when first regulation signal S1_REG 427 is logic high for a duration of time such that the counter 436 is equal to the decrement threshold TH_DEC 440 or the first regulation signal S1_REG 427 is logic low for a duration of time such that counter 437 is equal to the increment threshold TH_INC 441. As such, the reference generator 426 is able to regulate the first regulation reference REF1 431 in response to the first regulation signal S1_REG 427 in a closed loop manner.

Figure 4B:
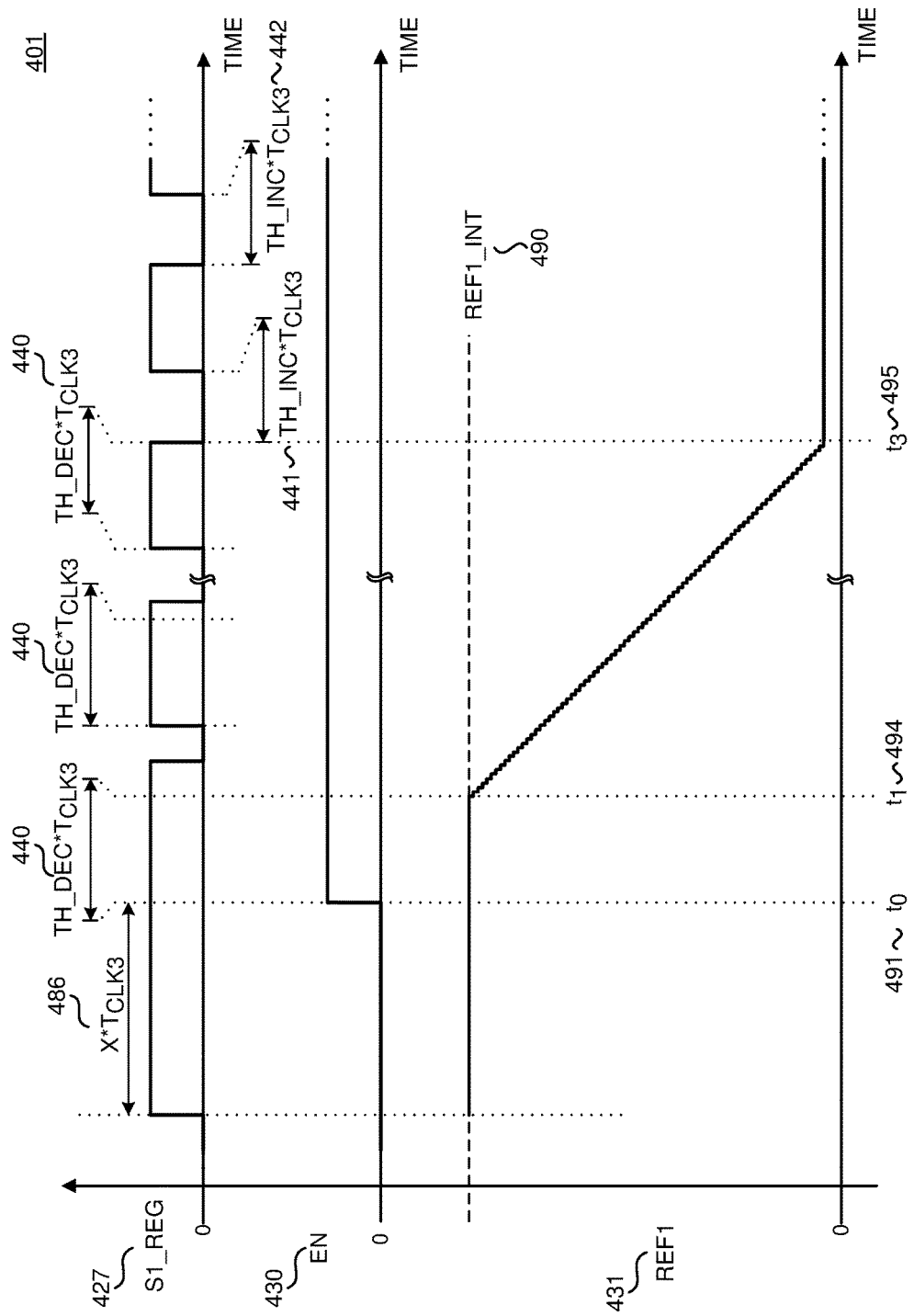
FIG. 4B is a timing diagram illustrating a decreasing reference of the reference generator of FIG. 4A, in accordance with embodiments of the present invention.

FIG. 4B illustrates an example timing diagram 401 that shows the first regulation reference REF1 431 decreasing. It should be appreciated that the timing for the various signals shown in FIG. 4B is consistent with similarly named and numbered signals from FIGS. 2A-4A. The first regulation reference REF1 431 begins at its initial value, REF1_INT 490 (as shown before with respect to FIG. 3A).

At time $t_0$ 491, the first regulation reference S1_REG 427 has been logic high long enough (i.e., the feedback signal FB is less than the first regulation reference REF1) to enable the reference generator 426 and the enable signal EN 430 transitions to a logic high value. As such, counter 436 is now enabled and begins incrementing its internal count. At time t1 494, the first regulation reference S1_REG 427 has been logic high for an amount of time substantially equal to the decrement value TH_DEC 440 times the period of the third clock signal CLK3 466 (i.e., TH_DEC*$T_{CLK3}$). In one example, the decrement value TH_DEC 440 times the period of the third clock signal CLK3 466, TH_DEC*$T_{CLK3}$, is substantially equal to 6 ms. As shown, the first regulation reference S1_REG 427 is still logic high after time $t_1$ 494 and as such the first regulation reference REF1 431 begins to decrease. The logic low portion of the first regulation signal S1_REG 427 is less than the increment value TH_INC 441 times the third clock period $T_{CLK3}$ 466 (i.e., TH_INC*$T_{CLK3}$) and the first regulation reference REF1 431 continues to decrement. In one example, the increment value TH_INC 441 times the third clock period $T_{CLK3}$ 466, TH_INC*$T_{CLK3}$, is substantially equal to 4 ms. In one example, the increment value TH_INC 441 and the decrement value TH_DEC 440 are not equal. For the example of PFC systems, unequal values for the increment value TH_INC 441 and the decrement value TH_DEC 440 allow the primary regulation reference REF1 431 to return to its initial value REF1_INT.

Figure 4C:
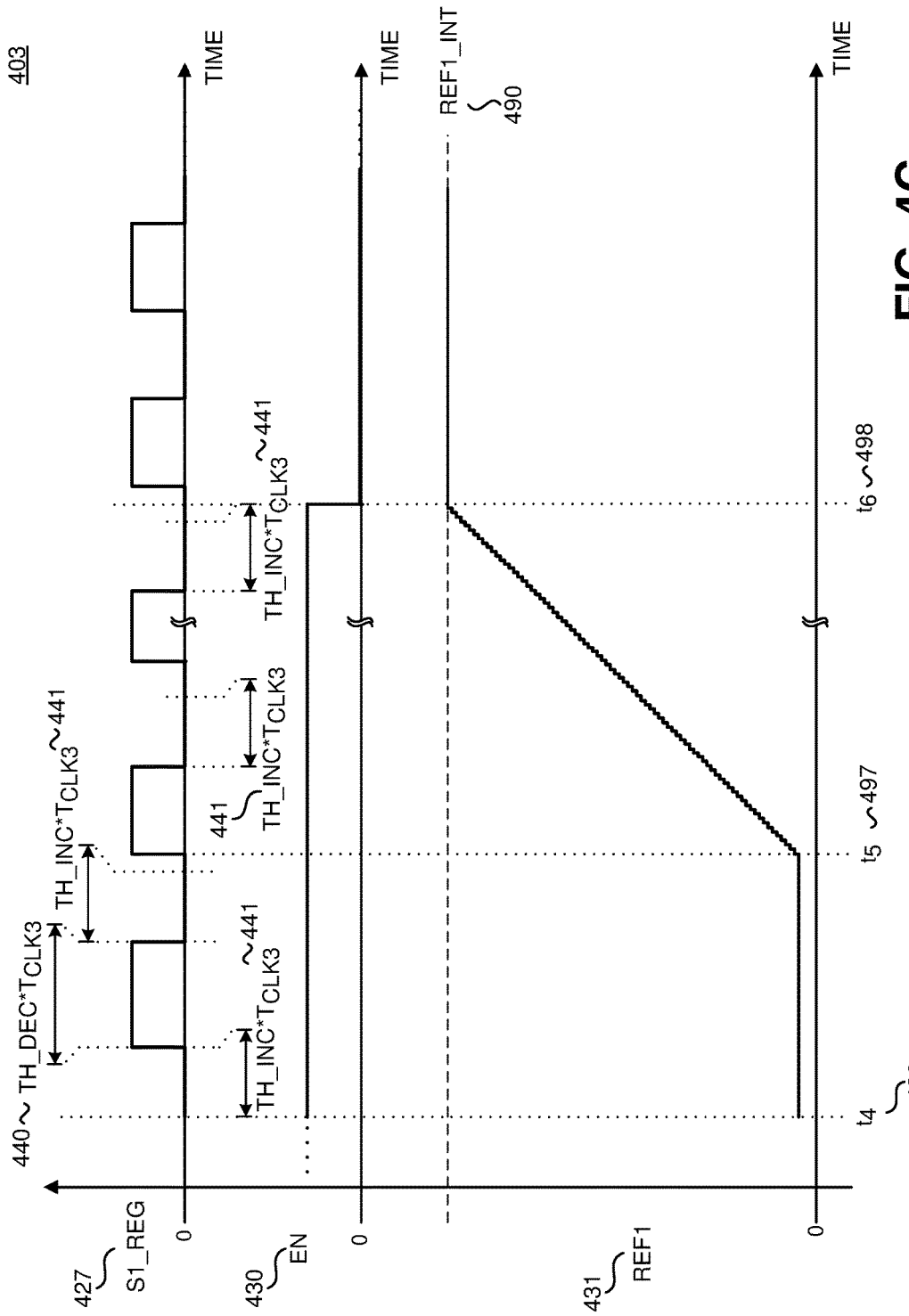
FIG. 4C is a timing diagram illustrating an increasing reference of the reference generator of FIG. 4A, in accordance with embodiments of the present invention.

The duration of the next logic high portion of the first regulation signal S1_REG 427 is still greater than TH_DEC*$T_{CLK3}$ and the first regulation reference REF1 431 continues to decrease. Once the duration of the logic high section of the first regulation signal S1_REG 427 is substantially equal to the duration TH_DEC*$T_{CLK3}$ (shown at time $t_3$ 495), the first regulation reference REF1 431 "stays" and does not decrement or increment. After time $t_3$ 495, the logic low portions are shown as substantially equal to the duration TH_INC*$T_{CLK3}$ and as such the first regulation reference REF1 431 "stays" and does not decrement. As such, the reference generator 426 varies the first regulation reference REF1 to regulate the first regulation signal S1_REG 427 such that logic high sections of the first regulation signal S1_REG 427 are substantially equal the duration TH_DEC*$T_{CLK3}$ while logic low sections are substantially equal to the duration TH_INC*$T_{CLK3}$. FIG. 4C illustrates an example timing diagram 403 that shows the first regulation reference REF1 431 increasing. It should be appreciated that the timing for the various signals shown in FIG. 4C is consistent with similarly named and numbered signals from FIGS. 2A-4B.

Timing diagram 403 begins at time $t_4$ 496, which is some duration after $t_3$ 495 shown in FIG. 4B. The first regulation reference REF1 431 has remained at the same value as shown in FIG. 4B. Between times t4 495 and t5 497, the first logic low section is substantially equal to the duration TH_INC*$T_{CLK3}$ and the first logic high section of the first regulation signal S1_REG 427 is substantially equal to the duration TH_DEC*$T_{CLK3}$, indicating that the first regulation reference REF1 has reached a steady state value to closed-loop regulate the first regulation signal S1_REG 427. However, the duration of the next logic low section is greater than TH_INC*$T_{CLK3}$ and at time t5 497, the first regulation reference REF1 431 begins to increase. The next logic high section is less than the duration of duration TH_DEC*$T_{CLK3}$, and the first regulation reference REF1 431 continues to increase. The first regulation reference REF1 431 continues to increase if the duration of logic low sections are less than TH_DEC*$T_{CLK3}$ and the duration of high sections are greater than TH_DEC*$T_{CLK3}$. However, at time $t_6$ 498, the first regulation reference REF1 has reached its initial value REF1_INT 490. As shown and discussed with respect to FIG. 3A, the enable signal EN 430 is now deasserted and the reference generator 426 does not vary the first regulation reference REF1 431.

Figure 5:
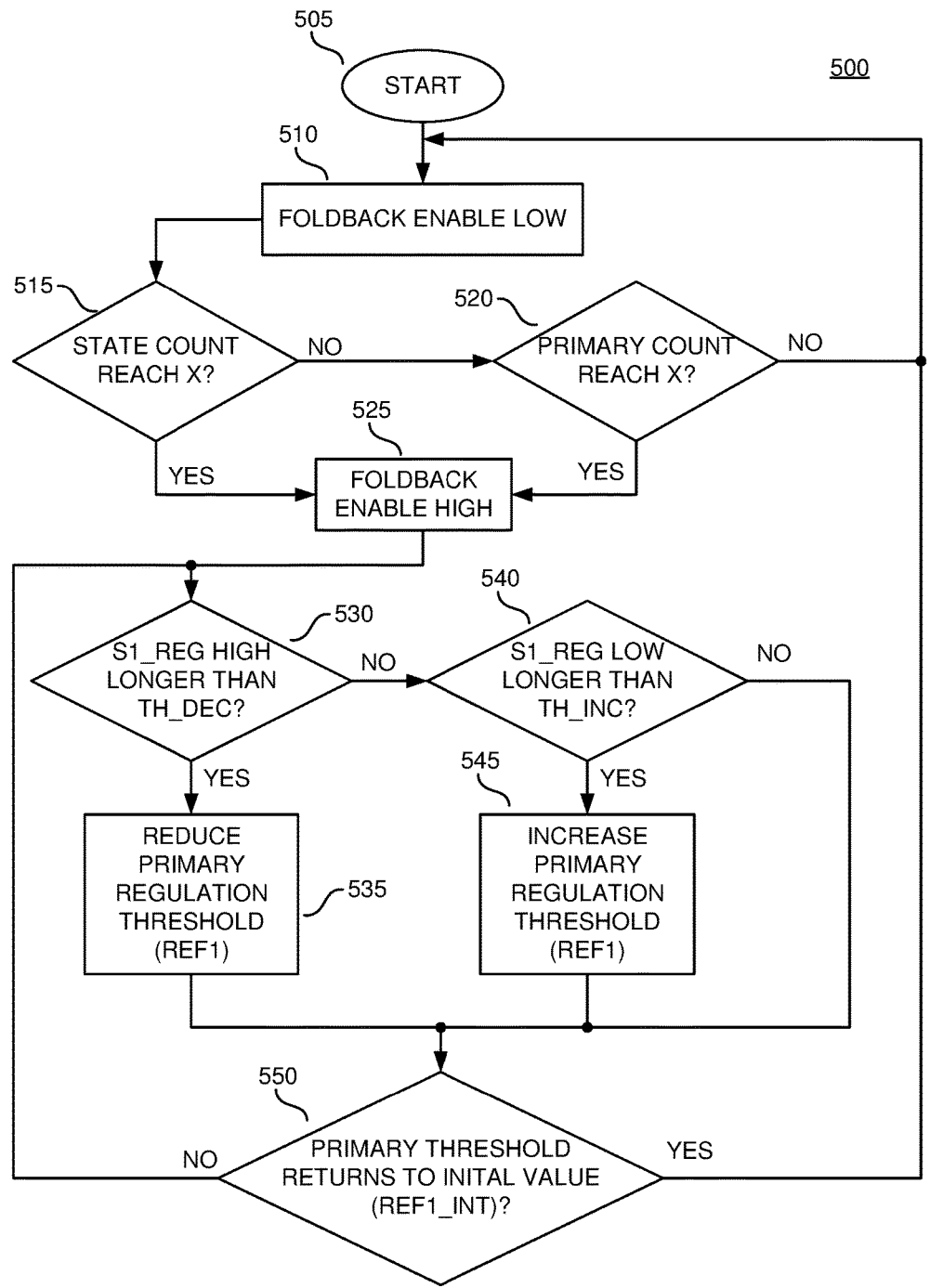
FIG. 5 is a flow diagram illustrating the steps to sensing foldback and varying a regulation reference of FIGS. 2A-4C, accordance with embodiments of the present invention.

FIG. 5 is a flow diagram illustrating one example of a process 500 to sense foldback and vary a regulation reference in a power conversion system as described FIGS. 2A-4C above, in accordance with the teachings of the present invention. It should be appreciated that the various elements and signals referred to in FIG. 5 are consistent with similarly named elements and signals from FIGS. 2A-4C. As shown, processing starts at process block 505 and proceeds to process block 510 where the enable signal output by the foldback sense to the reference generator is initialized or reset to a logic low so that the reference generator is not enabled to indicate that no foldback condition is sensed. At process block 525, a foldback condition has now been sensed and the foldback sense therefore outputs the enable signal to be logic high to enable the reference generator if either of the decision blocks 515 and 520 determine that the state count has reached X or that the primary count has reached X, respectively. If the state count has not reached X and if the primary count has not reached X, then processing loops back from decision blocks 515 and 525 back to process block 510 wherein the enable signal remains at logic low so that the reference generator remains not enabled.

If a foldback condition has been sensed and the reference generator has been enabled as determined at process block 525, decision block 530 then determines whether the S1_REG signal has been high (i.e., the first regulation reference REF1 is greater than the feedback signal FB) longer than the decrement threshold TH_DEC. If so, the primary regulation threshold REF1 is reduced at process block 535. If decision block 530 determines that the S1_REG signal has not been high (i.e., the first regulation reference REF1 is less than the feedback signal FB) longer than the decrement threshold TH_DEC, then decision block 540 determines whether the S1_REG signal has been low longer than the increment threshold TH_INC. If so, the primary regulation threshold REF1 is increased at process block 545. If the S1_REG signal has not been low longer than the increment threshold TH_INC, the primary regulation threshold REF1 is not changed and the process continues to decision block 550.

At decision block 550, it is determined whether the primary regulation threshold has returned to its initial value REF1_INT. If so, then processing loops back to process block 510 wherein the enable signal is set to logic low so that the reference generator is not enabled. If decision block 550 instead determines that the primary regulation threshold has not yet returned to its initial value REF1_INT, processing instead loops back to decision block 530 where it is determined whether the regulation reference REF1 should increment or decrement.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
   a comparator coupled to generate a regulation signal in response to a regulation reference and an output sense signal, wherein the output sense signal is representative of an output of the power converter;
a drive signal generator coupled to the comparator to generate a drive signal to control switching of a power switch of the power converter in response to the regulation signal, wherein the drive signal generator is further coupled to generate an operation sense signal representative of an operational state of the power switch; and
a foldback control coupled to the comparator and the drive signal generator to generate the regulation reference in response to the regulation signal and the operation sense signal, wherein the foldback control is coupled to sense a foldback or fault condition in response to the operation sense signal to vary the regulation reference to reduce the output of the power converter.

2. The controller of claim 1, further comprising a request control coupled to the comparator to generate a request signal in response to the regulation signal, wherein the power switch of the power converter is a second power switch and wherein the drive signal is a second drive signal, wherein a primary controller is coupled to generate a first drive signal to control switching of a first power switch of the power converter in response to the request signal.

3. The controller of claim 2, wherein the primary controller comprises:
a foldback circuit coupled to generate a foldback signal in response to an input voltage sense signal representative of an input voltage of the power converter or a temperature signal representative of one or more components of the power converter; and
a primary drive signal generator coupled to the foldback circuit to generate the first drive signal in response to the request signal and the foldback signal.

4. The controller of claim 2, wherein the request control comprises:
a first state machine coupled to the comparator to generate a first state signal in response to the regulation signal and a first clock signal; and
an oscillator coupled to the first state machine to generate the request signal in response to the first state signal.

5. The controller of claim 4, wherein the first state machine comprises:
a first counter coupled to generate a first count signal in response to the regulation signal and the first clock signal; and
a digital to analog converter coupled to the first counter to generate the first state signal in response to the first count signal.

6. A controller for use in a power converter, comprising:
a first comparator coupled to generate a first regulation signal in response to a first regulation reference and a feedback signal representative of an output of the power converter;
a foldback control coupled to the first comparator to generate the first regulation reference in response to the first regulation signal and an operation sense signal, wherein the foldback control is coupled to sense a foldback or fault condition in response to the operation sense signal to vary the first regulation reference to reduce the output of the power converter;
a second comparator coupled to generate a second regulation signal in response to the feedback signal and a second regulation reference;
a drive signal generator coupled to the second comparator to generate a drive signal to control switching of a second power switch of the power converter in response to the second regulation signal, wherein the drive signal generator is further coupled to generate the operation sense signal representative of an operational state of a first power switch of the power converter; and
a request control coupled to the first comparator to generate a request signal in response to the first regulation signal, wherein a primary controller is coupled to generate a first drive signal to control switching of the first power switch of the power converter in response to the request signal.

7. The controller of claim 6, wherein the primary controller comprises:
a foldback circuit coupled to generate a foldback signal in response to an input voltage sense signal representative of an input voltage of the power converter or a temperature signal representative of one or more components of the power converter; and
a primary drive signal generator coupled to the foldback circuit to generate the first drive signal in response to the request signal and the foldback signal.

8. The controller of claim 6, wherein the request control comprises:
a first state machine coupled to the comparator to generate a first state signal in response to the regulation signal and a first clock signal; and
an oscillator coupled to the first state machine to generate the request signal in response to the first state signal.

9. The controller of claim 8, wherein the first state machine comprises:
a first counter coupled to generate a first count signal in response to the regulation signal and the first clock signal; and
a digital to analog converter coupled to the first counter to generate the first state signal in response to the first count signal.

10. The controller of claim 6, wherein the drive signal generator comprises:
a second state machine coupled to generate a second state signal in response to the second regulation signal and a second clock signal;
a square wave generator coupled to the second state machine to generate the second drive signal in response to the second state signal; and
a state counter coupled to the second state machine to generate the operation sense signal in response to the second state signal and a third clock signal.

11. The controller of claim 10, wherein the second state machine comprises:
a second counter coupled to generate a second count signal in response to the second regulation signal and the second clock signal; and
a multiplexor coupled to the second counter to generate the second state signal in response to the second count signal.

12. The controller of claim 10,
wherein the second state signal is coupled begin at a first state having a first reference value at a power up of the power converter,
wherein the second state signal is coupled to transition from the first state to a second state having a second reference value if the feedback signal is greater than the second regulation reference for a threshold number of consecutive cycles of the second clock signal,
wherein the second state signal is coupled to transition from the second state to the first state if the feedback signal is less than the second regulation reference for the threshold number of consecutive cycles of the second clock signal, wherein the second state signal is coupled to transition from the second state to a fourth state having a fourth reference value if the feedback signal is greater than the second regulation reference for the threshold number of consecutive cycles of the second clock signal, wherein the second state signal is coupled to transition from the fourth state to a third state having a third reference value if the feedback signal is less than the second regulation reference for the threshold number of consecutive cycles of the second clock signal, wherein the second state signal is coupled to transition from the third state to the fourth state if the feedback signal is greater than the second regulation reference for the threshold number of consecutive cycles of the second clock signal, and wherein the second state signal is coupled to transition from the third state to the first state if the feedback signal is less than the second regulation reference for the threshold number of consecutive cycles of the second clock signal.

13. The controller of claim 12, wherein the threshold number of consecutive cycles is twelve consecutive cycles.

14. The controller of claim 6, wherein the foldback control comprises:
a foldback sense coupled to generate an enable signal in response to the first regulation signal and the operation sense signal, wherein the foldback sense is coupled to sense a foldback or fault condition in response to the feedback signal being less than the first reference signal for a threshold duration of time; and
a reference generator coupled to the foldback sense to generate the first regulation reference in response to the regulation signal and the enable signal, wherein the reference generator when not enabled is coupled to output the first regulation reference to regulate the output of the power converter to an initial first regulation reference value, wherein the reference generator when enabled is coupled to vary the first regulation reference in response to a shape of the first regulation signal.

15. The controller of claim 14, wherein the foldback sense comprises:
a third counter coupled to generate a third counter output in response to a third clock signal and the first regulation signal, wherein the third counter is coupled to increment the third counter output if the first regulation signal indicates that the output of the power converter is less than the first regulation reference; and
a latch coupled to output the enable signal, wherein the latch is coupled to be reset in response to a the first regulation reference reaching the initial first regulation reference value, and wherein the latch is coupled to be set in response to the operation sense signal being greater than a first threshold or in response to the third counter output being greater than a second threshold.

16. The controller of claim 15, wherein the first threshold is equal to the second threshold.

17. The controller of claim 14, wherein the reference generator comprises:
a fourth counter coupled to generate a fourth counter output in response to the third clock signal, the first regulation signal, and the enable signal, wherein if enabled in response to the enable signal the fourth counter is coupled to increment the fourth counter output if the first regulation signal indicates that the feedback signal is less than the first regulation reference;
a fifth counter coupled to generate a fifth counter output in response to the third clock signal, the first regulation signal, and the enable signal, wherein if enabled in response to the enable signal the fifth counter is coupled to increment the fifth counter output if the feedback signal FB is greater than the first regulation reference;
a first digital comparator coupled to compare the fourth counter output and a decrement threshold, wherein the first digital comparator includes a first output indicating that the fourth counter output is greater than the decrement threshold, wherein the first digital comparator includes a second output indicating that the fourth counter output is equal to the decrement threshold;
a second digital comparator coupled to compare the fifth counter output and an increment threshold, wherein the second digital comparator includes a first output indicating that the fifth counter output is greater than the increment threshold, wherein the second digital comparator includes a second output indicating that the fifth counter output is equal to the increment threshold;
a reference set point coupled to output the first regulation reference at an output of the reference set point, wherein the reference set point is coupled to decrement the first regulation reference in response to the first output of the first digital comparator, wherein the reference set point is coupled to increment the first regulation reference in response to the first output of the second digital comparator, and wherein the reference set point is coupled not to vary the first regulation reference in response to the second output of the first digital comparator or the second output of the second digital comparator.

18. The controller of claim 17, further comprising:
a first flip-flop having an input coupled to the first output of the first digital comparator, and an output coupled to a decrease input of the reference set point;
a second flip flop having an input coupled to the second output of the first digital comparator and the second output of the second digital comparator, and an output coupled to a stay input of the reference set point; and
a third flip-flop having an input coupled to the first output of the second digital comparator, and an output coupled to an increase input of the reference set point,
wherein the first flip-flop, the second flip-flop, and the third flip-flop are coupled to be clocked in response to the third clock signal.

19. The controller of claim 17, further comprising a digital to analog converter coupled to the output of the reference set point to convert the first regulation reference from digital to analog.

20. A power conversion system, comprising:
a first power converter, including:
a first power switch; and
a first controller coupled to control switching of the first power switch to convert an input voltage received at an input of the first power converter to a first voltage at an output of the first power converter; and
a second power converter, including:
a second power switch; and
a second controller coupled to control switching of the second power switch to convert the first voltage received at an input of the second power converter to a regulated output provided to a load coupled to an output of the second power converter, wherein the second controller includes:
- a comparator coupled to generate a regulation signal in response to a regulation reference and an output sense signal, wherein the output sense signal is representative of an output of the second power converter;
- a drive signal generator coupled to the comparator to generate a drive signal to control switching of the second power switch in response to the regulation signal, wherein the drive signal generator is further coupled to generate an operation sense signal representative of an operational state of the second power switch; and
- a foldback control coupled to the comparator and the drive signal generator to generate the regulation reference in response to the regulation signal and the operation sense signal, wherein the foldback control is coupled to sense a foldback or fault condition in response to the operation sense signal to vary the regulation reference to reduce the output of the power conversion system.

21. The power conversion system of claim 20, wherein the first controller includes:
- a foldback circuit coupled to generate a foldback signal in response to an input voltage sense signal representative of the input voltage of the first power converter or a temperature signal representative of one or more components of the first power converter; and
- a primary drive signal generator coupled to the foldback circuit to generate the first drive signal in response to the foldback signal.

22. The power conversion system of claim 20, wherein the foldback control comprises:
- a foldback sense coupled to generate an enable signal in response to the regulation signal and the operation sense signal, wherein the foldback sense is coupled to sense if the first power converter and first controller are operating under foldback or fault conditions from the operation sense signal representative of the operational state of the second power switch or the regulation signal; and
- a reference generator coupled to the foldback sense to generate the regulation reference in response to the regulation signal and the enable signal, wherein the reference generator when not enabled is coupled to output the regulation reference to regulate the output of the power conversion system to an initial regulation reference value, wherein the reference generator when enabled is coupled to vary the regulation reference in response to a shape of the regulation signal to reduce the output of the power conversion system.

23. A power conversion system, comprising:
- an energy transfer element coupled between a primary side and a secondary side of the power conversion system;
- a first power switch coupled to a primary side of the energy transfer element and an input of the power conversion system;
- a primary controller coupled to generate a first drive signal to control switching of the first power switch to control an amount of energy transferred by the energy transfer element from the primary side to the secondary side of the power conversion system;
- a second power switch coupled to a secondary side of the energy transfer element and an output of the power conversion system; and
- a secondary controller coupled to control switching of the second power switch to control a regulated output provided to a load coupled to the output of the power conversion system, wherein the second controller includes:
  - a comparator coupled to generate a regulation signal in response to a regulation reference and an output sense signal, wherein the output sense signal is representative of an output of the second power converter;
  - a request control coupled to the comparator to generate a request signal in response to the regulation signal, wherein the primary controller is coupled to generate the first drive signal to control switching of the first power switch in response to the request signal;
  - a drive signal generator coupled to the comparator to generate a second drive signal to control switching of the second power switch in response to the regulation signal, wherein the drive signal generator is further coupled to generate an operation sense signal representative of an operational state of the second power switch; and
  - a foldback control coupled to the comparator and the drive signal generator to generate the regulation reference in response to the regulation signal and the operation sense signal, wherein the foldback control is coupled to sense a foldback or fault condition in response to the operation sense signal to vary the regulation reference to reduce the output of the power conversion system.

24. The power conversion system of claim 23, wherein the primary controller includes:
- a foldback circuit coupled to generate a foldback signal in response to an input voltage sense signal representative of the input voltage of the power conversion system or a temperature signal representative of one or more components of the power conversion system; and
- a primary drive signal generator coupled to the foldback circuit to generate the first drive signal in response to the foldback signal and the request signal.

25. The power conversion system of claim 23, wherein the foldback control comprises:
- a foldback sense coupled to generate an enable signal in response to the regulation signal and the operation sense signal, wherein the foldback sense is coupled to sense if the primary controller is operating under foldback or fault conditions from the operation sense signal representative of the operational state of the second power switch or the regulation signal; and
- a reference generator coupled to the foldback sense to generate the regulation reference in response to the regulation signal and the enable signal, wherein the reference generator when not enabled is coupled to output the regulation reference to regulate the output of the power conversion system to an initial regulation reference value, wherein the reference generator when enabled is coupled to vary the regulation reference in response to a shape of the regulation signal to reduce the output of the power conversion system.

26. A power conversion system, comprising:
- an energy transfer element coupled between a primary side and a secondary side of the power conversion system;
- a first power switch coupled to a primary side of the energy transfer element and an input of the power conversion system;

a primary controller coupled to generate a first drive signal to control switching of the first power switch to control an amount of energy transferred by the energy transfer element from the primary side to the secondary side of the power conversion system;

a second power switch coupled to a secondary side of the energy transfer element and an output of the power conversion system; and a secondary controller coupled to control switching of the second power switch to control a regulated output provided to a load coupled to the output of the power conversion system, wherein the second controller includes:

a first comparator coupled to generate a first regulation signal in response to a first regulation reference and feedback signal representative of an output of the second power converter;

a request control coupled to the first comparator to generate a request signal in response to the first regulation signal, wherein the primary controller is coupled to generate the first drive signal to control switching of the first power switch in response to the request signal;

a second comparator coupled to generate a second regulation signal in response to the feedback signal and a second regulation reference;

a drive signal generator coupled to the second comparator to generate a second drive signal to control switching of the second power switch in response to the second regulation signal, wherein the drive signal generator is further coupled to generate an operation sense signal representative of an operational state of the second power switch; and a foldback control coupled to the first comparator and the drive signal generator to generate the first regulation reference in response to the first regulation signal and the operation sense signal, wherein the foldback control is coupled to sense a foldback or fault condition in response to the operation sense signal to vary the first regulation reference to reduce the output of the power conversion system.

27. The power conversion system of claim 26, wherein the primary controller includes:

a foldback circuit coupled to generate a foldback signal in response to an input voltage sense signal representative of the input voltage of the power conversion system or a temperature signal representative of one or more components of the power conversion system; and a primary drive signal generator coupled to the foldback circuit to generate the first drive signal in response to the foldback signal and the request signal.

28. The power conversion system of claim 26, wherein the request control comprises:

a first state machine coupled to the first comparator to generate a first state signal in response to the first regulation signal and a first clock signal; and an oscillator coupled to the first state machine to generate the request signal in response to the first state signal.

29. The power conversion system of claim 28, wherein the first state machine comprises:

a first counter coupled to generate a first count signal in response to the first regulation signal and the first clock signal; and a digital to analog converter coupled to the first counter to generate the first state signal in response to the first count signal.

30. The power conversion system of claim 26, wherein the drive signal generator comprises:

a second state machine coupled to generate a second state signal in response to the second regulation signal and a second clock signal;

a square wave generator coupled to the second state machine to generate the second drive signal in response to the second state signal; and a state counter coupled to the second state machine to generate the operation sense signal in response to the second state signal and a third clock signal.

31. The power conversion system of claim 30, wherein the second state machine comprises:

a second counter coupled to generate a second count signal in response to the second regulation signal and the second clock signal; and a multiplexor coupled to the second counter to generate the second state signal in response to the second count signal.

32. The power conversion system of claim 31, wherein the second state signal is coupled begin at a first state having a first reference value at a power up of the power conversion system, wherein the second state signal is coupled to transition from the first state to a second state having a second reference value if the feedback signal is greater than the second regulation reference for a threshold number of consecutive cycles of the second clock signal, wherein the second state signal is coupled to transition from the second state to the first state if the feedback signal is less than the second regulation reference for the threshold number of consecutive cycles of the second clock signal, wherein the second state signal is coupled to transition from the second state to a fourth state having a fourth reference value if the feedback signal is greater than the second regulation reference for the threshold number of consecutive cycles of the second clock signal, wherein the second state signal is coupled to transition from the fourth state to a third state having a third reference value if the feedback signal is less than the second regulation reference for the threshold number of consecutive cycles of the second clock signal, wherein the second state signal is coupled to transition from the third state to the fourth state if the feedback signal is greater than the second regulation reference for the threshold number of consecutive cycles of the second clock signal, and wherein the second state signal is coupled to transition from the third state to the first state if the feedback signal is less than the second regulation reference for the threshold number of consecutive cycles of the second clock signal.

33. The power conversion system of claim 32, wherein the threshold number of consecutive cycles is twelve consecutive cycles.

34. The power conversion system of claim 30, wherein the foldback control comprises:

a foldback sense coupled to generate an enable signal in response to the first regulation signal and the operation sense signal, wherein the foldback sense is coupled to sense a foldback or fault condition in response to the feedback signal being less than the first reference signal for a threshold duration of time; and a reference generator coupled to the foldback sense to generate the first regulation reference in response to the first regulation signal and the enable signal, wherein the reference generator when not enabled is coupled to output the first regulation reference to regulate the output of the power conversion system to an initial first regulation reference value, wherein the reference generator when enabled is coupled to vary the first regulation reference in response to a shape of the first regulation signal to reduce the output of the power conversion system.

35. The power conversion system of claim 34, wherein the foldback sense comprises:
a third counter coupled to generate a third counter output in response to a third clock signal and the first regulation signal, wherein the third counter is coupled to increment the third counter output if the first regulation signal indicates that the output of the power converter is less than the first regulation reference; and
a latch coupled to output the enable signal, wherein the latch is coupled to be reset in response to a the first regulation reference reaching the initial first regulation reference value, and wherein the latch is coupled to be set in response to the operation sense signal being greater than a first threshold or in response to the third counter output being greater than a second threshold.

36. The power conversion system of claim 35, wherein the first threshold is equal to the second threshold.

37. The power conversion system of claim 34, wherein the reference generator comprises:
a fourth counter coupled to generate a fourth counter output in response to the third clock signal, the first regulation signal, and the enable signal, wherein if enabled in response to the enable signal the fourth counter is coupled to increment the fourth counter output if the first regulation signal indicates that the feedback signal is less than the first regulation reference;
a fifth counter coupled to generate a fifth counter output in response to the third clock signal, the first regulation signal, and the enable signal, wherein if enabled in response to the enable signal the fifth counter is coupled to increment the fifth counter output if the feedback signal FB is greater than the first regulation reference;
a first digital comparator coupled to compare the fourth counter output and a decrement threshold, wherein the first digital comparator includes a first output indicating that the fourth counter output is greater than the decrement threshold, wherein the first digital comparator includes a second output indicating that the fourth counter output is equal to the decrement threshold;
a second digital comparator coupled to compare the fifth counter output and an increment threshold, wherein the second digital comparator includes a first output indicating that the fifth counter output is greater than the increment threshold, wherein the second digital comparator includes a second output indicating that the fifth counter output is equal to the increment threshold;
a reference set point coupled to output the first regulation reference at an output of the reference set point, wherein the reference set point is coupled to decrement the first regulation reference in response to the first output of the first digital comparator, wherein the reference set point is coupled to increment the first regulation reference in response to the first output of the second digital comparator, and wherein the reference set point is coupled not to vary the first regulation reference in response to the second output of the first digital comparator or the second output of the second digital comparator.

38. The power conversion system of claim 37, further comprising:
a first flip-flop having an input coupled to the first output of the first digital comparator, and an output coupled to a decrease input of the reference set point;
a second flip flop having an input coupled to the second output of the first digital comparator and the second output of the second digital comparator, and an output coupled to a stay input of the reference set point; and
a third flip-flop having an input coupled to the first output of the second digital comparator, and an output coupled to an increase input of the reference set point,
wherein the first flip-flop, the second flip-flop, and the third flip-flop are coupled to be clocked in response to the third clock signal.

39. The power conversion system of claim 37, further comprising a digital to analog converter coupled to the output of the reference set point to convert the first regulation reference from digital to analog.

40. A method of detecting and a foldback condition and varying a regulation reference in a power conversion system, comprising:
setting an enable signal representative of the foldback condition to a first state;
setting the enable signal to a second state if a state count reaches a first threshold value;
setting the enable signal to the second state if a primary count reaches a second threshold value;
reducing the regulation reference until a first regulation signal returns to an initial value if the first regulation signal is in the second state longer than a decrement threshold;
increasing the regulation reference until the first regulation signal returns to the initial value if the first regulation signal is in the first state longer than an increment threshold; setting the enable signal back to the first state if the first regulation signal returns to the initial value.

41. The method of claim 40, wherein the first state is a logic low value and wherein the second state is a logic high value.

42. The method of claim 40, wherein the first threshold value is equal to the second threshold value.

43. The method of claim 40, wherein the state count reaching the first threshold value indicates that a feedback signal representative of an output of the power conversion being less than the regulation reference for at least the first threshold value.

* * * * *